(12) United States Patent
Tsai et al.

(10) Patent No.: US 8,462,446 B2
(45) Date of Patent: Jun. 11, 2013

(54) OPTICAL IMAGING LENS ASSEMBLY

(75) Inventors: Tsung Han Tsai, Taichung (TW); Hsin Hsuan Huang, Taichung (TW)

(73) Assignee: Largan Precision, Co., Ltd., Taichung (TW)

(*) Notice: Subject to any disclaimer, the term of this patent is extended or adjusted under 35 U.S.C. 154(b) by 0 days.

(21) Appl. No.: 13/608,944

(22) Filed: Sep. 10, 2012

(65) Prior Publication Data

US 2013/0002931 A1    Jan. 3, 2013

Related U.S. Application Data

(62) Division of application No. 12/980,824, filed on Dec. 29, 2010, now Pat. No. 8,395,852.

(30) Foreign Application Priority Data

Oct. 15, 2010    (TW) ................................ 99135183 A

(51) Int. Cl.
*G02B 13/18* (2006.01)
*G02B 9/60* (2006.01)

(52) U.S. Cl.
USPC .......................................... 359/714; 359/764

(58) Field of Classification Search
USPC ............................................ 359/714, 753, 764
See application file for complete search history.

(56) References Cited

U.S. PATENT DOCUMENTS

| | | | |
|---|---|---|---|
| 7,365,920 B2 | 4/2008 | Noda | |
| 7,864,454 B1 * | 1/2011 | Tang et al. | 359/764 |
| 2011/0149415 A1 | 6/2011 | Jeong | |
| 2011/0181963 A1 | 7/2011 | Kwon | |

* cited by examiner

*Primary Examiner* — William Choi
(74) *Attorney, Agent, or Firm* — Morris Manning & Martin LLP; Tim Tingkang Xia, Esq.

(57) ABSTRACT

This invention provides an optical imaging lens assembly comprising five lens elements with refractive power, in order from an object side to an image side: a first lens element with positive refractive power having a convex object-side surface; a second lens element with negative refractive power; a third lens element with negative refractive power; a fourth lens element with negative refractive power having at least one of the object-side and image-side surfaces thereof being aspheric; and a fifth lens element having a concave image-side surface, at least one of the object-side and image-side surfaces thereof being aspheric, and made of plastic. By such arrangement, photosensitivity and total track length of the optical imaging lens assembly can be reduced, and the aberration and astigmatism of the assembly can be effectively corrected. Moreover, high image resolution can be obtained.

11 Claims, 41 Drawing Sheets

| TABLE 1 | | | | | | |
|---|---|---|---|---|---|---|
| (Embodiment 1) | | | | | | |
| f = 4.52 mm, Fno = 2.40, HFOV = 32.0 deg. | | | | | | |
| Surface # | | Curvature Radius | Thickness | Material | Index | Abbe # | Focal length |
| 0 | Object | Plano | Infinity | | | |
| 1 | Lens 1 | 1.63263 (ASP) | 0.798 | Plastic | 1.544 | 55.9 | 2.92 |
| 2 | | -51.47110 (ASP) | -0.012 | | | | |
| 3 | Ape. Stop | Plano | 0.111 | | | | |
| 4 | Lens 2 | -23.41370 (ASP) | 0.280 | Plastic | 1.632 | 23.4 | -6.47 |
| 5 | | 4.98170 (ASP) | 0.652 | | | | |
| 6 | Lens 3 | -2.04839 (ASP) | 0.511 | Plastic | 1.632 | 23.4 | -25.17 |
| 7 | | -2.57824 (ASP) | 0.085 | | | | |
| 8 | Lens 4 | 4.71280 (ASP) | 0.583 | Plastic | 1.544 | 55.9 | -98.39 |
| 9 | | 4.14270 (ASP) | 0.500 | | | | |
| 10 | Lens 5 | 1.47493 (ASP) | 0.492 | Plastic | 1.544 | 55.9 | 39.29 |
| 11 | | 1.39800 (ASP) | 0.700 | | | | |
| 12 | IR-filter | Plano | 0.300 | Glass | 1.517 | 64.2 | - |
| 13 | | Plano | 0.309 | | | | |
| 14 | Image | Plano | - | | | | |
| Note: Reference wavelength is d-line(587.6 nm) | | | | | | | |

Fig.11

| TABLE 2 | | | | | |
|---|---|---|---|---|---|
| Aspheric Coefficients | | | | | |
| Surface # | 1 | 2 | 4 | 5 | 6 |
| k = | -2.81251E-01 | -7.00000E+01 | -2.00000E+01 | -2.20092E+00 | 6.34031E-01 |
| A4 = | 3.08917E-03 | -5.77614E-02 | -1.81681E-02 | 4.04977E-02 | -9.17050E-02 |
| A6 = | -1.71589E-02 | 2.31864E-02 | 8.43896E-02 | 3.73742E-02 | 1.85729E-02 |
| A8 = | 1.77458E-02 | -8.16878E-03 | -2.19123E-02 | 8.73576E-02 | -3.75916E-02 |
| A10 = | -2.23802E-02 | -2.26113E-02 | -1.99201E-02 | -1.70958E-01 | 4.15597E-02 |
| A12 = |  | 1.45003E-02 | 3.45160E-02 | 1.41233E-01 | -1.87902E-02 |
| Surface # | 7 | 8 | 9 | 10 | 11 |
| k = | 2.49641E+00 | -1.63065E+01 | 1.35469E+00 | -3.81453E+00 | -3.25578E+00 |
| A4 = | -8.73792E-02 | -4.32064E-02 | -4.14484E-02 | -5.35332E-02 | -5.23292E-02 |
| A6 = | 6.73068E-02 | 8.89608E-03 | -8.05011E-05 | 6.52757E-03 | 9.57245E-03 |
| A8 = | -1.76601E-02 | 3.09149E-04 | 6.44510E-04 | 2.37389E-04 | -1.42015E-03 |
| A10 = | 1.14756E-02 | -5.01342E-04 | 2.03614E-05 | -5.05142E-05 | 6.21860E-05 |
| A12 = | 6.87690E-04 | 4.10597E-05 | -3.93173E-05 |  | 1.98946E-05 |
| A14 = |  |  |  |  | -1.91746E-06 |

Fig.12

| TABLE 3 | | | | | | | |
|---|---|---|---|---|---|---|---|
| (Embodiment 2) | | | | | | | |
| f = 4.79 mm, Fno = 2.40, HFOV = 30.6 deg. | | | | | | | |
| Surface # | | Curvature Radius | Thickness | Material | Index | Abbe # | Focal length |
| 0 | Object | Plano | Infinity | | | | |
| 1 | Lens 1 | 1.75708 (ASP) | 0.849 | Plastic | 1.544 | 55.9 | 3.26 |
| 2 | | 136.01740 (ASP) | -0.013 | | | | |
| 3 | Ape. Stop | Plano | 0.111 | | | | |
| 4 | Lens 2 | 12.61600 (ASP) | 0.280 | Plastic | 1.632 | 23.4 | -8.04 |
| 5 | | 3.59090 (ASP) | 0.840 | | | | |
| 6 | Lens 3 | -1.94389 (ASP) | 0.588 | Plastic | 1.632 | 23.4 | -81.00 |
| 7 | | -2.25731 (ASP) | 0.050 | | | | |
| 8 | Lens 4 | 3.11050 (ASP) | 0.482 | Plastic | 1.544 | 55.9 | -108.84 |
| 9 | | 2.79391(ASP) | 0.526 | | | | |
| 10 | Lens 5 | 1.84014 (ASP) | 0.486 | Plastic | 1.544 | 55.9 | -64.83 |
| 11 | | 1.58614 (ASP) | 0.700 | | | | |
| 12 | IR-filter | Plano | 0.300 | Glass | 1.517 | 64.2 | - |
| 13 | | Plano | 0.307 | | | | |
| 14 | Image | Plano | - | | | | |
| Note: Reference wavelength is d-line(587.6 nm) | | | | | | | |

Fig.13

| TABLE 4 | | | | | |
|---|---|---|---|---|---|
| Aspheric Coefficients | | | | | |
| Surface # | 1 | 2 | 4 | 5 | 6 |
| k = | -1.63822E-01 | -7.00000E+01 | -2.00000E+01 | 2.02975E-01 | -7.56346E-01 |
| A4 = | -1.68417E-03 | -5.14457E-02 | -2.64254E-02 | 2.57716E-02 | -4.46459E-02 |
| A6 = | -1.30296E-02 | 2.87279E-03 | 2.64093E-02 | 1.29458E-02 | -2.82345E-02 |
| A8 = | 8.81347E-03 | 1.81000E-02 | 5.05661E-02 | 7.72767E-02 | 3.74727E-02 |
| A10 = | -1.08636E-02 | -2.95442E-02 | -6.01925E-02 | -9.37631E-02 | -2.52252E-02 |
| A12 = |  | 1.19794E-02 | 3.06058E-02 | 6.20517E-02 | 9.22431E-03 |
| Surface # | 7 | 8 | 9 | 10 | 11 |
| k = | 1.11596E+00 | -6.75529E+00 | 7.68112E-02 | -5.50079E+00 | -4.73728E+00 |
| A4 = | -3.42925E-02 | -3.56284E-02 | -6.05968E-02 | -8.24402E-02 | -6.00701E-02 |
| A6 = | 3.17196E-02 | 5.98321E-03 | 5.29506E-03 | 1.07444E-02 | 6.83558E-03 |
| A8 = | -3.28456E-03 | 1.00094E-03 | 2.41727E-04 | 7.28779E-04 | -1.55234E-04 |
| A10 = | 4.66189E-03 | -4.21183E-04 | -1.64453E-05 | -1.60270E-04 | -5.57511E-05 |
| A12 = | -2.53479E-04 | 3.45628E-05 | -1.76069E-05 |  | 7.27319E-06 |
| A14 = | 0.00000E+00 |  |  |  | -2.27154E-07 |

Fig.14

| TABLE 5 | | | | | | | |
|---|---|---|---|---|---|---|---|
| (Embodiment 3) | | | | | | | |
| f = 5.35 mm, Fno = 2.75, HFOV = 33.5 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.290 | | | | |
| 2 | Lens 1 | 1.60099 (ASP) | 0.585 | Plastic | 1.544 | 55.9 | 3.90 |
| 3 | | 5.66120 (ASP) | 0.100 | | | | |
| 4 | Lens 2 | -12.06140 (ASP) | 0.300 | Plastic | 1.632 | 23.4 | -9.64 |
| 5 | | 12.43360 (ASP) | 0.469 | | | | |
| 6 | Lens 3 | 4.48170 (ASP) | 0.425 | Plastic | 1.632 | 23.4 | -43.04 |
| 7 | | 3.70640 (ASP) | 0.721 | | | | |
| 8 | Lens 4 | -1.28443 (ASP) | 0.365 | Plastic | 1.544 | 55.9 | -81.16 |
| 9 | | -1.45538 (ASP) | 0.100 | | | | |
| 10 | Lens 5 | 2.14433 (ASP) | 1.000 | Plastic | 1.530 | 55.8 | 20.67 |
| 11 | | 2.23558 (ASP) | 1.000 | | | | |
| 12 | IR-filter | Plano | 0.300 | Glass | 1.517 | 64.2 | - |
| 13 | | Plano | 0.739 | | | | |
| 14 | Image | Plano | - | | | | |
| Note: Reference wavelength is d-line(587.6 nm) | | | | | | | |

Fig.15

| TABLE 6 | | | | | |
|---|---|---|---|---|---|
| Aspheric Coefficients | | | | | |
| Surface # | 2 | 3 | 4 | 5 | 6 |
| k   = | 3.03094E-01 | 1.43813E+01 | -1.00000E+00 | -1.47958E+01 | 1.55212E+00 |
| A4 = | -1.48977E-02 | -7.26427E-02 | 6.67533E-03 | 6.25317E-02 | -8.05665E-02 |
| A6 = | -3.58949E-03 | 6.89153E-03 | 9.35113E-02 | 1.17987E-01 | -2.16808E-02 |
| A8 = | -2.06871E-02 | 2.52598E-02 | -3.88892E-02 | -8.64728E-02 | -1.31660E-02 |
| A10 = | 1.75075E-02 | -3.58795E-02 | 1.03609E-02 | 5.80741E-02 | 3.42915E-02 |
| A12 = | -2.27044E-02 | | | | -2.59816E-02 |
| A14 = | | | | | 2.29278E-03 |
| A16 = | | | | | -8.61343E-04 |
| Surface # | 7 | 8 | 9 | 10 | 11 |
| k   = | 2.46834E+00 | -1.11989E+00 | -7.61971E-01 | -6.13482E+00 | -5.94947E+00 |
| A4 = | -5.37452E-02 | 1.94167E-01 | 9.49476E-02 | -4.84106E-02 | -3.84237E-02 |
| A6 = | -3.80295E-02 | -7.76999E-02 | -1.14485E-02 | 1.22552E-02 | 7.47097E-03 |
| A8 = | 2.25651E-02 | -6.56209E-03 | 2.37304E-03 | -1.33526E-03 | -1.40793E-03 |
| A10 = | -8.50382E-03 | 1.51429E-02 | -1.10336E-03 | 2.53721E-05 | 2.01353E-04 |
| A12 = | | -4.75281E-03 | 1.21241E-04 | | -1.71827E-05 |
| A14 = | | | | | 4.76681E-07 |

Fig.16

| TABLE 7 | | | | | | | |
|---|---|---|---|---|---|---|---|
| (Embodiment 4) | | | | | | | |
| f = 4.76 mm, Fno = 2.60, HFOV = 31.0 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.144 | | | | |
| 2 | Lens 1 | 1.78677 (ASP) | 0.778 | Plastic | 1.544 | 55.9 | 2.76 |
| 3 | | -7.93750 (ASP) | 0.061 | | | | |
| 4 | Lens 2 | -17.98430 (ASP) | 0.381 | Plastic | 1.632 | 23.4 | -5.41 |
| 5 | | 4.25720 (ASP) | 0.886 | | | | |
| 6 | Lens 3 | -2.15460 (ASP) | 0.508 | Plastic | 1.544 | 55.9 | -38.42 |
| 7 | | -2.60176 (ASP) | 0.070 | | | | |
| 8 | Lens 4 | 2.25406 (ASP) | 0.577 | Plastic | 1.544 | 55.9 | -45.01 |
| 9 | | 1.87791 (ASP) | 0.292 | | | | |
| 10 | Lens 5 | 2.36551 (ASP) | 0.547 | Plastic | 1.583 | 30.2 | -25.75 |
| 11 | | 1.86962 (ASP) | 0.300 | | | | |
| 12 | IR-filter | Plano | 0.300 | Glass | 1.517 | 64.2 | - |
| 13 | | Plano | 0.604 | | | | |
| 14 | Image | Plano | - | | | | |
| Note: Reference wavelength is d-line(587.6 nm) | | | | | | | |

Fig.17

| TABLE 8 | | | | | |
|---|---|---|---|---|---|
| Aspheric Coefficients | | | | | |
| Surface # | 2 | 3 | 4 | 5 | 6 |
| k = | -5.26310E-01 | 1.00000E+01 | -1.92168E+01 | 1.26239E+01 | -1.04921E+01 |
| A4 = | -6.32001E-03 | -5.54526E-02 | -5.65074E-04 | 4.37577E-02 | -2.78831E-02 |
| A6 = | -1.01714E-02 | -4.59447E-02 | -3.22627E-02 | -2.55288E-02 | -4.15112E-02 |
| A8 = | -7.98206E-03 | 1.94080E-02 | 2.02107E-02 | 4.15191E-02 | 2.73192E-02 |
| A10 = | -2.25195E-02 | 1.57929E-02 | 6.45160E-02 | -2.90119E-02 | -9.78203E-03 |
| A12 = | | -1.41900E-02 | -2.95357E-02 | 2.38501E-02 | -6.48802E-03 |
| Surface # | 7 | 8 | 9 | 10 | 11 |
| k = | 7.66842E-01 | -7.59792E+00 | -1.56369E+00 | -3.32263E+01 | -1.96935E+01 |
| A4 = | -1.97604E-02 | -8.27333E-02 | -8.02679E-02 | -2.56259E-02 | -3.37416E-02 |
| A6 = | 3.35909E-02 | 1.05069E-02 | 1.44496E-02 | 6.92739E-03 | 2.02822E-03 |
| A8 = | -7.43531E-03 | 1.27901E-03 | -1.50511E-03 | -5.53573E-04 | 8.48302E-04 |
| A10 = | -7.97533E-04 | -6.68086E-04 | -1.96628E-05 | -5.14486E-05 | -1.14725E-04 |
| A12 = | 5.03357E-04 | 6.39079E-06 | -1.25172E-05 | | -5.92789E-07 |
| A14 = | | | | | 9.45061E-08 |

Fig.18

| TABLE 9 | | | | | | | |
|---|---|---|---|---|---|---|---|
| (Embodiment 5) | | | | | | | |
| f = 4.29 mm, Fno = 2.85, HFOV = 33.4 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.149 | | | | |
| 2 | Lens 1 | 1.55979 (ASP) | 0.634 | Plastic | 1.544 | 55.9 | 2.38 |
| 3 | | -6.49250 (ASP) | 0.052 | | | | |
| 4 | Lens 2 | -12.60080 (ASP) | 0.300 | Plastic | 1.632 | 23.4 | -4.82 |
| 5 | | 4.05520 (ASP) | 0.799 | | | | |
| 6 | Lens 3 | -0.75470 (ASP) | 0.352 | Plastic | 1.544 | 55.9 | -67.17 |
| 7 | | -0.89727 (ASP) | 0.050 | | | | |
| 8 | Lens 4 | 1.98992 (ASP) | 0.493 | Plastic | 1.530 | 55.8 | -6.12 |
| 9 | | 1.12769 (ASP) | 0.150 | | | | |
| 10 | Lens 5 | 2.07655 (ASP) | 1.002 | Plastic | 1.530 | 55.8 | 6.22 |
| 11 | | 4.66890 (ASP) | 0.400 | | | | |
| 12 | IR-filter | Plano | 0.400 | Glass | 1.517 | 64.2 | - |
| 13 | | Plano | 0.471 | | | | |
| 14 | Image | Plano | - | | | | |
| Note: Reference wavelength is d-line(587.6 nm) | | | | | | | |

Fig.19

| TABLE 10 | | | | | |
|---|---|---|---|---|---|
| Aspheric Coefficients | | | | | |
| Surface # | 2 | 3 | 4 | 5 | 6 |
| k = | -1.05865E+00 | -8.87989E+01 | -2.49085E+02 | -5.51321E+00 | -3.27123E+00 |
| A4 = | 3.52000E-03 | -1.33027E-01 | 1.05925E-02 | 1.17907E-01 | -4.06492E-01 |
| A6 = | -1.07581E-02 | -3.17439E-02 | -4.16753E-03 | 2.60164E-02 | 3.29207E-01 |
| A8 = | -5.29347E-02 | -6.75464E-02 | 4.93867E-03 | 7.59243E-02 | 4.51297E-02 |
| A10 = | -2.41374E-01 | -1.60525E-02 | -7.37891E-02 | -1.71671E-01 | -9.16305E-02 |
| A12 = | 3.50642E-01 | 9.39841E-02 | 3.09225E-01 | 8.88509E-02 | -3.24521E-01 |
| A14 = | -5.21059E-02 | 7.31631E-02 | -5.98218E-02 | 3.44629E-01 | 7.34308E-01 |
| A16 = | -3.39505E-01 | -2.14505E-01 | -1.64353E-01 | -3.21664E-01 | -5.74014E-01 |
| Surface # | 7 | 8 | 9 | 10 | 11 |
| k = | -1.53455E+00 | -2.76300E+01 | -1.10544E+01 | -3.47397E+01 | -7.92710E+01 |
| A4 = | -3.30952E-02 | -8.03931E-02 | -5.06349E-02 | 5.36330E-03 | -1.03669E-02 |
| A6 = | -6.92926E-04 | 3.55803E-02 | 1.80717E-02 | -3.63560E-07 | 1.12659E-03 |
| A8 = | 8.50616E-02 | -1.11210E-02 | -5.28598E-03 | -7.60266E-06 | 5.39790E-05 |
| A10 = | 5.99177E-02 | 1.27119E-03 | 6.88277E-04 | -1.37685E-06 | -3.65896E-06 |
| A12 = | -4.74049E-02 | 1.45050E-04 | -3.02289E-07 | -2.95252E-07 | -1.03671E-06 |
| A14 = | -4.63510E-02 | -7.66921E-05 | -1.31638E-05 | | |
| A16 = | 2.66928E-02 | -1.24645E-06 | 6.56727E-07 | | |

Fig.20

| TABLE 11 | | | | | | | |
|---|---|---|---|---|---|---|---|
| (Embodiment 6) | | | | | | | |
| f = 4.25 mm, Fno = 2.78, HFOV = 33.7 deg. | | | | | | | |
| Surface # | | Curvature Radius | Thickness | Material | Index | Abbe # | Focal length |
| 0 | Object | Plano | Infinity | | | | |
| 1 | Lens 1 | 1.52357 (ASP) | 0.550 | Plastic | 1.544 | 55.9 | 2.54 |
| 2 | | -13.04810 (ASP) | -0.026 | | | | |
| 3 | Ape. Stop | Plano | 0.076 | | | | |
| 4 | Lens 2 | 11.80780 (ASP) | 0.301 | Plastic | 1.632 | 23.4 | -4.60 |
| 5 | | 2.30853 (ASP) | 0.945 | | | | |
| 6 | Lens 3 | -0.76403 (ASP) | 0.281 | Plastic | 1.544 | 55.9 | -23.95 |
| 7 | | -0.91680 (ASP) | 0.050 | | | | |
| 8 | Lens 4 | 1.64330 (ASP) | 0.421 | Plastic | 1.530 | 55.8 | -8.50 |
| 9 | | 1.09714 (ASP) | 0.211 | | | | |
| 10 | Lens 5 | 1.54425 (ASP) | 0.891 | Plastic | 1.530 | 55.8 | 5.20 |
| 11 | | 2.81348 (ASP) | 0.700 | | | | |
| 12 | IR-filter | Plano | 0.300 | Glass | 1.517 | 64.2 | - |
| 13 | | Plano | 0.303 | | | | |
| 14 | Image | Plano | - | | | | |
| Note: Reference wavelength is d-line(587.6 nm) | | | | | | | |

Fig.21

| TABLE 12 | | | | | |
|---|---|---|---|---|---|
| Aspheric Coefficients | | | | | |
| Surface # | 1 | 2 | 4 | 5 | 6 |
| k = | -1.02845E+00 | -2.94529E+01 | -1.00000E+00 | -5.77044E+00 | -3.41910E+00 |
| A4 = | 4.87729E-03 | -7.71854E-02 | -7.78524E-03 | 1.23440E-01 | -4.25550E-01 |
| A6 = | -1.22079E-03 | 3.28452E-02 | 9.73814E-02 | 3.60684E-02 | 3.22413E-01 |
| A8 = | -3.16853E-02 | -1.57837E-01 | -9.98091E-02 | 7.46474E-02 | 5.45571E-02 |
| A10 = | -2.27075E-01 | -1.95986E-02 | -7.32809E-02 | -1.85971E-01 | -9.48621E-02 |
| A12 = | 2.88882E-01 | 1.80849E-01 | 3.51059E-01 | 1.17467E-01 | -3.08765E-01 |
| A14 = | -1.39644E-01 | 3.22011E-02 | -5.98195E-02 | 3.44631E-01 | 7.44592E-01 |
| A16 = | -6.35739E-02 | -2.14504E-01 | -1.64352E-01 | -3.21663E-01 | -5.53267E-01 |
| Surface # | 7 | 8 | 9 | 10 | 11 |
| k = | -1.30619E+00 | -1.88798E+01 | -1.04566E+01 | -1.60571E+01 | -2.98299E+01 |
| A4 = | -4.12074E-02 | -5.95076E-02 | -5.53668E-02 | 3.52411E-03 | -5.65742E-03 |
| A6 = | 4.28797E-03 | 3.29081E-02 | 1.72091E-02 | -3.30521E-04 | 1.87878E-03 |
| A8 = | 8.86250E-02 | -1.16117E-02 | -5.53280E-03 | 1.46181E-05 | -5.16556E-05 |
| A10 = | 6.12898E-02 | 1.33011E-03 | 6.43490E-04 | 4.27934E-06 | -1.20206E-05 |
| A12 = | -4.74555E-02 | 1.96978E-04 | 2.30285E-06 | -7.34065E-07 | -6.95181E-08 |
| A14 = | -4.72378E-02 | -5.83274E-05 | -1.07996E-05 | | |
| A16 = | 2.55071E-02 | 3.42570E-06 | 7.16867E-07 | | |

Fig.22

| TABLE 13 | | | | | | |
|---|---|---|---|---|---|---|
| (Embodiment 7) | | | | | | |
| f = 4.24 mm, Fno = 2.80, HFOV = 33.6 deg. | | | | | | |
| Surface # | | Curvature Radius | Thickness | Material | Index | Abbe # | Focal length |
| 0 | Object | Plano | Infinity | | | | |
| 1 | Lens 1 | 1.50983 (ASP) | 0.554 | Plastic | 1.544 | 55.9 | 2.50 |
| 2 | | -11.80780 (ASP) | -0.030 | | | | |
| 3 | Ape. Stop | Plano | 0.091 | | | | |
| 4 | Lens 2 | -29.18690 (ASP) | 0.298 | Plastic | 1.632 | 23.4 | -4.78 |
| 5 | | 3.38100 (ASP) | 0.944 | | | | |
| 6 | Lens 3 | -0.77530 (ASP) | 0.295 | Plastic | 1.544 | 55.9 | -27.26 |
| 7 | | -0.92775 (ASP) | 0.050 | | | | |
| 8 | Lens 4 | 1.66531 (ASP) | 0.399 | Plastic | 1.530 | 55.8 | -5.97 |
| 9 | | 1.00043 (ASP) | 0.164 | | | | |
| 10 | Lens 5 | 1.42638 (ASP) | 0.903 | Plastic | 1.530 | 55.8 | 4.37 |
| 11 | | 2.90245 (ASP) | 0.700 | | | | |
| 12 | IR-filter | Plano | 0.300 | Glass | 1.517 | 64.2 | - |
| 13 | | Plano | 0.317 | | | | |
| 14 | Image | Plano | - | | | | |
| Note: Reference wavelength is d-line(587.6 nm) | | | | | | |

Fig.23

| TABLE 14 | | | | | |
|---|---|---|---|---|---|
| Aspheric Coefficients | | | | | |
| Surface # | 1 | 2 | 4 | 5 | 6 |
| k = | -9.98199E-01 | -2.16046E+01 | -1.00000E+00 | -8.42032E+00 | -3.38895E+00 |
| A4 = | 5.99605E-03 | -8.19948E-02 | 1.02473E-02 | 1.18371E-01 | -4.29852E-01 |
| A6 = | 3.08816E-03 | 3.58121E-02 | 1.06072E-01 | 4.35516E-02 | 3.17427E-01 |
| A8 = | -3.20533E-02 | -1.59274E-01 | -1.15547E-01 | 6.18687E-02 | 5.28308E-02 |
| A10 = | -2.42158E-01 | -1.26814E-02 | -8.46496E-02 | -2.16191E-01 | -9.05250E-02 |
| A12 = | 3.00322E-01 | 1.98911E-01 | 3.63294E-01 | 1.68342E-01 | -2.99323E-01 |
| A14 = | -1.12017E-01 | -1.58246E-02 | -3.79787E-02 | 3.07373E-01 | 7.38437E-01 |
| A16 = | -1.10330E-01 | -2.14504E-01 | -1.64352E-01 | -3.21663E-01 | -5.74630E-01 |
| Surface # | 7 | 8 | 9 | 10 | 11 |
| k = | -1.30424E+00 | -1.91293E+01 | -8.82808E+00 | -1.41201E+01 | -2.98278E+01 |
| A4 = | -4.06027E-02 | -5.93176E-02 | -4.82872E-02 | 4.61242E-03 | -7.22885E-03 |
| A6 = | 4.73584E-03 | 3.30756E-02 | 1.69736E-02 | -5.37941E-05 | 1.98088E-03 |
| A8 = | 8.80160E-02 | -1.16228E-02 | -5.49777E-03 | 1.54834E-05 | 1.14684E-05 |
| A10 = | 6.11991E-02 | 1.32831E-03 | 6.55454E-04 | 2.71424E-06 | -1.13074E-05 |
| A12 = | -4.71880E-02 | 1.96742E-04 | 3.86672E-06 | -7.54083E-07 | -5.77482E-07 |
| A14 = | -4.68793E-02 | -5.81966E-05 | -1.05641E-05 | | |
| A16 = | 2.60156E-02 | 3.46393E-06 | 7.31293E-07 | | |

Fig.24

| TABLE 15 | | | | | | |
|---|---|---|---|---|---|---|
| (Embodiment 8) | | | | | | |
| f = 4.72 mm, Fno = 2.60, HFOV = 30.9 deg. | | | | | | |
| Surface # | | Curvature Radius | Thickness | Material | Index | Abbe # | Focal length |
| 0 | Object | Plano | Infinity | | | | |
| 1 | Lens 1 | 1.60522 (ASP) | 0.735 | Plastic | 1.544 | 55.9 | 2.88 |
| 2 | | -59.42720 (ASP) | 0.026 | | | | |
| 3 | Ape. Stop | Plano | 0.090 | | | | |
| 4 | Lens 2 | 132.24080 (ASP) | 0.286 | Plastic | 1.632 | 23.4 | -5.77 |
| 5 | | 3.54680 (ASP) | 0.666 | | | | |
| 6 | Lens 3 | -2.07024 (ASP) | 0.511 | Plastic | 1.632 | 23.4 | -25.51 |
| 7 | | -2.60228 (ASP) | 0.446 | | | | |
| 8 | Lens 4 | 4.22620 (ASP) | 0.607 | Plastic | 1.544 | 55.9 | 146.51 |
| 9 | | 4.23690 (ASP) | 0.280 | | | | |
| 10 | Lens 5 | 1.47397 (ASP) | 0.399 | Plastic | 1.544 | 55.9 | 256.61 |
| 11 | | 1.34759 (ASP) | 0.700 | | | | |
| 12 | IR-filter | Plano | 0.300 | Glass | 1.517 | 64.2 | - |
| 13 | | Plano | 0.353 | | | | |
| 14 | Image | Plano | - | | | | |
| Note: Reference wavelength is d-line(587.6 nm) | | | | | | | |

Fig.25

| TABLE 16 | | | | | |
| --- | --- | --- | --- | --- | --- |
| Aspheric Coefficients | | | | | |
| Surface # | 1 | 2 | 4 | 5 | 6 |
| k = | -2.80162E-01 | -7.00000E+01 | -1.00000E+00 | -4.48751E+00 | 1.08381E+00 |
| A4 = | 3.83159E-03 | -5.19438E-02 | -2.87061E-02 | 3.84415E-02 | -1.13654E-01 |
| A6 = | -1.74217E-02 | 1.81423E-02 | 8.92153E-02 | 5.23072E-02 | 2.72974E-02 |
| A8 = | 1.63642E-02 | -6.99780E-03 | -1.39873E-02 | 9.10851E-02 | -3.52568E-02 |
| A10 = | -2.40070E-02 | -1.57522E-02 | -1.31727E-02 | -1.68810E-01 | 3.99944E-02 |
| A12 = | | 8.12214E-03 | 2.58312E-02 | 1.54514E-01 | -2.09512E-02 |
| Surface # | 7 | 8 | 9 | 10 | 11 |
| k = | 2.65108E+00 | -6.91039E+00 | 2.05479E+00 | -3.81339E+00 | -3.19894E+00 |
| A4 = | -9.45229E-02 | -4.48471E-02 | -3.45013E-02 | -5.63157E-02 | -5.75891E-02 |
| A6 = | 6.56853E-02 | 9.08872E-03 | -6.26083E-04 | 7.27207E-03 | 1.07551E-02 |
| A8 = | -1.84628E-02 | 4.32828E-04 | 4.30544E-04 | 2.34605E-04 | -1.36170E-03 |
| A10 = | 1.12420E-02 | -4.85425E-04 | 4.77424E-05 | -5.68937E-05 | 5.43606E-05 |
| A12 = | 3.41800E-04 | 4.23420E-05 | -2.77813E-05 | | 1.92553E-05 |
| A14 = | | | | | -1.91700E-06 |

Fig.26

| TABLE 17 | | | | | | |
|---|---|---|---|---|---|---|
| (Embodiment 9) | | | | | | |
| f = 4.31 mm, Fno = 2.40, HFOV= 33.2 deg. | | | | | | |
| Surface # | | Curvature Radius | Thickness | Material | Index | Abbe # | Focal length |
| 0 | Object | Plano | Infinity | | | | |
| 1 | Lens 1 | 1.64434 (ASP) | 0.746 | Plastic | 1.544 | 55.9 | 2.95 |
| 2 | | -57.48420 (ASP) | 0.060 | | | | |
| 3 | Ape. Stop | Plano | 0.061 | | | | |
| 4 | Lens 2 | -47.05880 (ASP) | 0.293 | Plastic | 1.632 | 23.4 | -6.10 |
| 5 | | 4.20740 (ASP) | 0.610 | | | | |
| 6 | Lens 3 | -2.03564 (ASP) | 0.457 | Plastic | 1.632 | 23.4 | -18.98 |
| 7 | | -2.66471 (ASP) | 0.101 | | | | |
| 8 | Lens 4 | 3.70080 (ASP) | 0.641 | Plastic | 1.544 | 55.9 | 33.00 |
| 9 | | 4.37700 (ASP) | 0.481 | | | | |
| 10 | Lens 5 | 1.31622 (ASP) | 0.447 | Plastic | 1.544 | 55.9 | 31.62 |
| 11 | | 1.25467 (ASP) | 0.700 | | | | |
| 12 | IR-filter | Plano | 0.300 | Glass | 1.517 | 64.2 | - |
| 13 | | Plano | 0.306 | | | | |
| 14 | Image | Plano | - | | | | |
| Note: Reference wavelength is d-line(587.6 nm) | | | | | | |

Fig.27

| TABLE 18 | | | | | |
|---|---|---|---|---|---|
| Aspheric Coefficients | | | | | |
| Surface # | 1 | 2 | 4 | 5 | 6 |
| k = | -2.88130E-01 | -7.00000E+01 | -2.00000E+01 | -4.61263E+00 | 5.16177E-01 |
| A4 = | 3.18231E-03 | -5.00316E-02 | -2.23234E-02 | 3.74876E-02 | -8.73472E-02 |
| A6 = | -1.70238E-02 | 2.54682E-02 | 9.05429E-02 | 3.97765E-02 | 2.11895E-02 |
| A8 = | 1.77545E-02 | -8.81853E-03 | -2.15351E-02 | 9.17684E-02 | -4.32236E-02 |
| A10 = | -2.18056E-02 | -2.31214E-02 | -1.94318E-02 | -1.72651E-01 | 4.96312E-02 |
| A12 = | | 1.23887E-02 | 2.45285E-02 | 1.33990E-01 | -2.22956E-02 |
| Surface # | 7 | 8 | 9 | 10 | 11 |
| k = | 2.89739E+00 | -1.00779E+01 | 2.49149E+00 | -3.44973E+00 | -3.08605E+00 |
| A4 = | -9.58138E-02 | -4.10149E-02 | -3.67952E-02 | -5.71115E-02 | -5.56768E-02 |
| A6 = | 6.72474E-02 | 8.68928E-03 | -1.35791E-03 | 6.87951E-03 | 1.03683E-02 |
| A8 = | -1.79506E-02 | 2.88370E-04 | 7.45989E-04 | 2.36141E-04 | -1.48767E-03 |
| A10 = | 1.27449E-02 | -4.64521E-04 | 1.97103E-05 | -4.99298E-05 | 6.09530E-05 |
| A12 = | 7.85402E-04 | 4.32708E-05 | -3.68193E-05 | | 2.01406E-05 |
| A14 = | | | | | -1.88393E-06 |

Fig.28

| TABLE 19 | | | | | | |
|---|---|---|---|---|---|---|
| (Embodiment 10) | | | | | | |
| f = 4.74 mm, Fno = 2.80, HFOV = 30.1 deg. | | | | | | |
| Surface # | | Curvature Radius | Thickness | Material | Index | Abbe # | Focal length |
| 0 | Object | Plano | Infinity | | | | |
| 1 | Lens 1 | 1.73174 (ASP) | 0.794 | Plastic | 1.544 | 55.9 | 3.36 |
| 2 | | 28.20320 (ASP) | 0.120 | | | | |
| 3 | Lens 2 | 13.18370 (ASP) | 0.280 | Plastic | 1.634 | 23.8 | -7.45 |
| 4 | | 3.45020 (ASP) | 0.090 | | | | |
| 5 | Ape. Stop | Plano | 0.732 | | | | |
| 6 | Lens 3 | -2.13417 (ASP) | 0.553 | Plastic | 1.632 | 23.4 | -21.35 |
| 7 | | -2.78959 (ASP) | 0.320 | | | | |
| 8 | Lens 4 | 3.34140(ASP) | 0.424 | Plastic | 1.544 | 55.9 | 18.71 |
| 9 | | 4.75090(ASP) | 0.652 | | | | |
| 10 | Lens 5 | 1.43766 (ASP) | 0.436 | Plastic | 1.544 | 55.9 | -187.87 |
| 11 | | 1.26621 (ASP) | 0.700 | | | | |
| 12 | IR-filter | Plano | 0.300 | Glass | 1.517 | 64.2 | - |
| 13 | | Plano | 0.240 | | | | |
| 14 | Image | Plano | - | | | | |
| Note: Reference wavelength is d-line(587.6 nm) | | | | | | |

Fig.29

| TABLE 20 | | | | | |
|---|---|---|---|---|---|
| Aspheric Coefficients | | | | | |
| Surface # | 1 | 2 | 3 | 4 | 6 |
| k = | -9.75311E-02 | 2.04855E-01 | -2.00000E+01 | -1.08862E+01 | 1.15179E+00 |
| A4 = | 6.79417E-03 | -3.86323E-02 | -4.95594E-02 | 2.44430E-02 | -9.91736E-02 |
| A6 = | -1.99209E-02 | 2.27097E-02 | 8.03893E-02 | 1.99521E-02 | 1.22116E-02 |
| A8 = | 2.13291E-02 | -4.82508E-03 | -6.10589E-03 | 1.16047E-01 | -2.35167E-02 |
| A10 = | -1.29828E-02 | -1.03122E-02 | -2.48012E-02 | -1.50361E-01 | 5.57291E-02 |
| A12 = |  | 4.07591E-03 | 1.45627E-02 | 5.88841E-02 | -2.05975E-02 |
| Surface # | 7 | 8 | 9 | 10 | 11 |
| k = | 3.34860E+00 | -9.45614E+00 | 3.76811E+00 | -2.84726E+00 | -2.27852E+00 |
| A4 = | -1.00915E-01 | -4.06540E-02 | -3.69536E-02 | -6.36901E-02 | -6.77363E-02 |
| A6 = | 6.19257E-02 | 9.29315E-03 | -7.70630E-04 | 7.05914E-03 | 1.36780E-02 |
| A8 = | -1.74319E-02 | 5.45749E-04 | 8.20242E-04 | 3.58578E-04 | -1.70843E-03 |
| A10 = | 1.09208E-02 | -4.70412E-04 | 6.67566E-05 | -6.31439E-05 | 3.27243E-05 |
| A12 = | 1.04292E-03 | 3.96025E-05 | -4.80474E-05 |  | 2.23904E-05 |
| A14 = |  |  |  |  | -1.88366E-06 |

Fig.30

TABLE 21

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| f | 4.52 | 4.79 | 5.35 | 4.76 | 4.29 | 4.25 | 4.24 | 4.72 | 4.31 | 4.74 |
| Fno | 2.40 | 2.40 | 2.75 | 2.60 | 2.85 | 2.78 | 2.80 | 2.60 | 2.40 | 2.80 |
| HFOV | 32.0 | 30.6 | 33.5 | 31.0 | 33.4 | 33.7 | 33.6 | 30.9 | 33.2 | 30.1 |
| V1-V2 | 32.5 | 32.5 | 32.5 | 32.5 | 32.5 | 32.5 | 32.5 | 32.5 | 32.5 | 32.1 |
| V1-V2-V3 | 9.1 | 9.1 | 9.1 | -23.4 | -23.4 | -23.4 | -23.4 | 9.1 | 9.1 | 8.7 |
| \|R1/R2\| | 0.03 | 0.01 | 0.28 | 0.23 | 0.24 | 0.12 | 0.13 | 0.03 | 0.03 | 0.06 |
| R5/R6 | 0.79 | 0.86 | 1.21 | 0.83 | 0.84 | 0.83 | 0.84 | 0.80 | 0.76 | 0.77 |
| R7/R8 | 1.14 | 1.11 | 0.88 | 1.20 | 1.76 | 1.50 | 1.66 | 1.00 | 0.85 | 0.70 |
| R9/R10 | 1.06 | 1.16 | 0.96 | 1.27 | 0.44 | 0.55 | 0.49 | 1.09 | 1.05 | 1.14 |
| (CT2/f)*100 | 6.19 | 5.85 | 5.61 | 8.00 | 6.99 | 7.08 | 7.03 | 6.06 | 6.80 | 5.91 |
| (T23/f)*10 | 1.44 | 1.75 | 0.88 | 1.86 | 1.86 | 2.22 | 2.23 | 1.41 | 1.42 | 1.73 |
| f2/f3 | 0.26 | 0.10 | 0.22 | 0.14 | 0.07 | 0.19 | 0.18 | 0.23 | 0.32 | 0.35 |
| \|f3/f4\| | 0.26 | 0.74 | 0.53 | 0.85 | 10.98 | 2.82 | 4.57 | 0.17 | 0.58 | 1.14 |
| \|f/f3\|+\|f/f4\|+\|f/f5\| | 0.34 | 0.18 | 0.45 | 0.41 | 1.45 | 1.49 | 1.84 | 0.24 | 0.49 | 0.50 |
| SL/TTL | 0.85 | 0.85 | 0.95 | 0.97 | 0.97 | 0.89 | 0.89 | 0.86 | 0.84 | 0.77 |
| TTL/ImgH | 1.82 | 1.89 | 1.70 | 1.82 | 1.74 | 1.72 | 1.71 | 1.86 | 1.79 | 1.98 |

Fig. 31

OPTICAL IMAGING LENS ASSEMBLY

CROSS-REFERENCE TO RELATED APPLICATIONS

This non-provisional application is a divisional application of U.S. patent application Ser. No. 12/980,824, filed Dec. 29, 2010, which itself claims priority under 35 U.S.C. §119(a) on Patent Application No. 099135183 filed in Taiwan, R.O.C. on Oct. 15, 2010, the entire contents of which are hereby incorporated by reference.

BACKGROUND OF THE INVENTION

1. Field of the Invention

The present invention relates to an optical imaging lens assembly, and more particularly, to a compact optical imaging lens assembly used in an electronic product.

2. Description of the Prior Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the resolution of compact imaging lenses has gradually increased, there is an increasing demand for compact imaging lens assembly featuring better image quality.

A conventional compact imaging lens system equipped on a portable electronic product, such as the one set forth in U.S. Pat. No. 7,365,920, generally has a main structure of four lens elements. However, due to the popularity of high standard mobile devices such as smart phones and PDAs (Personal Digital Assistant) driving the rapid improvements in high resolution and image quality of the current compact imaging lens systems, conventional four lens elements systems no longer satisfy the higher level camera modules.

Inasmuch as the foregoing, a need exists in the art for an optical imaging lens assembly that features better image quality and is compact while maintaining a moderate total track length.

SUMMARY OF THE INVENTION

The present invention provides an optical imaging lens assembly comprising five lens elements with refractive power, in order from an object side to an image side: a first lens element with positive refractive power having a convex object-side surface; a second lens element with negative refractive power; a third lens element with negative refractive power; a fourth lens element with negative refractive power, and at least one of the object-side and image-side surfaces thereof being aspheric; and a fifth lens element having a concave image-side surface, at least one of the object-side and image-side surfaces thereof being aspheric, and the fifth lens element is made of plastic; wherein a focal length of the second lens element is f2, a focal length of the third lens element is f3, and they satisfy the relation: $0<f2/f3<1.7$.

On the other hand, the present invention provides an optical imaging lens assembly comprising five lens elements with refractive power, in order from an object side to an image side: a first lens element with positive refractive power having a convex object-side surface; a second lens element with negative refractive power; a third lens element with negative refractive power; a fourth lens element having a convex object-side surface and a concave image-side surface, and at least one of the object-side and image-side surfaces thereof being aspheric; and a fifth lens element having a concave image-side surface, at least one of the object-side and image-side surfaces thereof being aspheric, and at least one inflection point is formed on at least one of the object-side and image-side surfaces thereof; wherein a focal length of the second lens element is f2, a focal length of the third lens element is f3, the optical imaging lens assembly further comprises an aperture stop, a distance on an optical axis between the aperture stop and an image plane is SL, a distance on the optical axis between the object-side surface of the first lens element and the image plane is TTL, and they satisfy the relation: $0<f2/f3<1.7$; and $0.65<SL/TTL<0.92$.

By such arrangement, photosensitivity and total track length of the optical imaging lens assembly can be reduced, and the aberration and astigmatism of the assembly can be effectively corrected. Moreover, high image resolution can be obtained.

In the aforementioned optical imaging lens assembly, the first lens element has positive refractive power and thereby can provide the main refractive power that the assembly needs, which is favorable for reducing the total track length of the optical imaging lens assembly. The second lens element has negative refractive power, and thereby the aberration produced by the first lens element can be effectively corrected and the chromatic aberration of the system can be favorably corrected in the same time. The third lens element has negative refractive power and thereby can cooperate with the second lens element for aberration correction, chromatic aberration correction and reducing the sensitivity of the assembly. The fourth lens element has negative refractive power, and thereby the Petzval Sum of the assembly can be favorably corrected so that enabling the peripheral image plane to become flatter. When the fifth lens element has positive refractive power, the total optical track length of the assembly can be favorably reduced and thereby keeping the lens compact.

In the aforementioned optical imaging lens assembly, the first lens element may be a bi-convex lens element or a meniscus lens element having a convex object-side surface and a concave image-side surface; when the first lens element is a bi-convex lens element, the distribution of the refractive power of the first lens element can be effectively improved, and thereby the total track length of the optical imaging lens assembly can be further shortened; when the first lens element is a meniscus lens element having a convex object-side surface and a concave image-side surface, the astigmatism of the assembly is favorably corrected. When the second lens element has a concave image-side surface, the back focal length of the assembly is enlarged effectively and thereby ensuring that the optical imaging lens assembly has enough back focal length for placing other elements. When the third lens element has a concave object-side surface and a convex image-side surface, the astigmatism of the assembly is favorably corrected. When the fourth lens element has a convex object-side surface and a concave image-side surface, a balance between enlarging the back focal length and reducing the total track length of the optical imaging lens assembly can be favorably obtained, and the aberration of the assembly can be effectively corrected. When the fifth lens element has a concave image-side surface, the principal point of the optical system can be positioned away from the image plane and thereby reducing the total optical track length of the system for keeping the lens compact. When the fifth lens element has a convex object-side surface and a concave image-side surface, the astigmatism and the high order aberration of the assembly can be favorably corrected.

BRIEF DESCRIPTION OF THE DRAWINGS

FIG. 11 is TABLE 1 which lists the optical data of the first embodiment.

FIG. 12 is TABLE 2 which lists the aspheric surface data of the first embodiment.

FIG. 13 is TABLE 3 which lists the optical data of the second embodiment.

FIG. 14 is TABLE 4 which lists the aspheric surface data of the second embodiment.

FIG. 15 is TABLE 5 which lists the optical data of the third embodiment.

FIG. 16 is TABLE 6 which lists the aspheric surface data of the third embodiment.

FIG. 17 is TABLE 7 which lists the optical data of the fourth embodiment.

FIG. 18 is TABLE 8 which lists the aspheric surface data of the fourth embodiment.

FIG. 19 is TABLE 9 which lists the optical data of the fifth embodiment.

FIG. 20 is TABLE 10 which lists the aspheric surface data of the fifth embodiment.

FIG. 21 is TABLE 11 which lists the optical data of the sixth embodiment.

FIG. 22 is TABLE 12 which lists the aspheric surface data of the sixth embodiment.

FIG. 23 is TABLE 13 which lists the optical data of the seventh embodiment.

FIG. 24 is TABLE 14 which lists the aspheric surface data of the seventh embodiment.

FIG. 25 is TABLE 15 which lists the optical data of the eighth embodiment.

FIG. 26 is TABLE 16 which lists the aspheric surface data of the eighth embodiment.

FIG. 27 is TABLE 17 which lists the optical data of the ninth embodiment.

FIG. 28 is TABLE 18 which lists the aspheric surface data of the ninth embodiment.

FIG. 29 is TABLE 19 which lists the optical data of the tenth embodiment.

FIG. 30 is TABLE 20 which lists the aspheric surface data of the tenth embodiment.

FIG. 31 is TABLE 21 which lists the data of the respective embodiments resulting from the equations.

DETAILED DESCRIPTION OF THE PREFERRED EMBODIMENTS

Figure 1A:
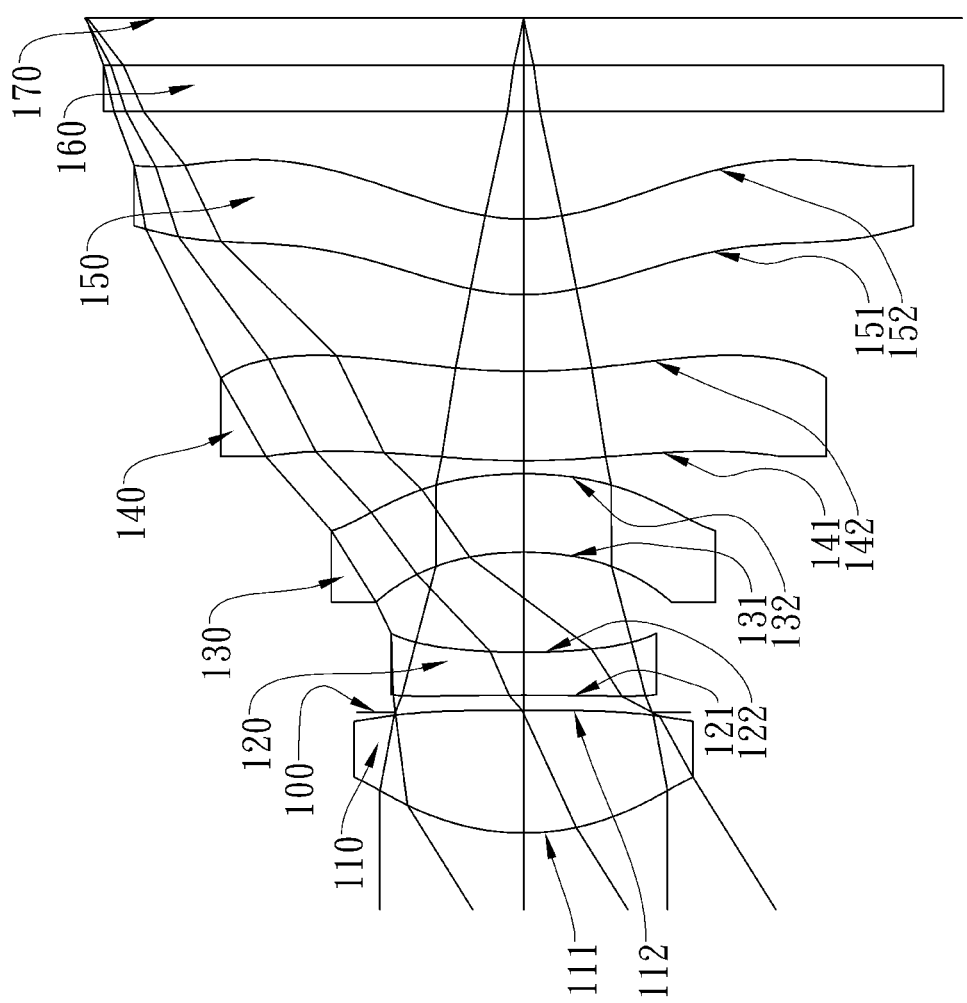
FIG. 1A shows an optical imaging lens assembly in accordance with a first embodiment of the present invention.

The present invention provides an optical imaging lens assembly comprising five lens elements with refractive power, in order from an object side to an image side: a first lens element with positive refractive power having a convex object-side surface; a second lens element with negative refractive power; a third lens element with negative refractive power; a fourth lens element with negative refractive power, and at least one of the object-side and image-side surfaces thereof being aspheric; and a fifth lens element having a concave image-side surface, at least one of the object-side and image-side surfaces thereof being aspheric, and the fifth lens element is made of plastic; wherein a focal length of the second lens element is f2, a focal length of the third lens element is f3, and they satisfy the relation: $0 < f2/f3 < 1.7$.

When the relation of $0 < f2/f3 < 1.7$ is satisfied, the distribution of the negative refractive power of the second and the third lens elements is more proper for reducing the sensitivity and correcting the aberration of the assembly effectively, preferably, the following relation is satisfied: $0 < f2/f3 < 0.7$.

In the aforementioned optical imaging lens assembly, a focal length of the optical imaging lens assembly is f, a focal length of the third lens element is f3, a focal length of the fourth lens element is f4, a focal length of the fifth lens element is f5, and they preferably satisfy the relation: $0 < \sqrt[3]{|f/f3| + |f/f4| + |f/f5|} < 1.7$. When the above relation is satisfied, the refractive power of the third, fourth and fifth lens elements is adjusted well and thereby the sensitivity of the assembly can be reduced; more preferably, the following relation is satisfied: $0 < |f/f3| + |f/f4| + |f/f5| < 0.8$.

In the aforementioned optical imaging lens assembly, an Abbe number of the first lens element is V1, an Abbe number of the second lens element is V2, and they preferably satisfy the relation: $20 < V1 - V2 < 45$. When the above relation is satisfied, the chromatic aberration of the assembly can be favorably corrected; more preferably, the following relation is satisfied: $30 < V1 - V2 < 42$.

In the aforementioned optical imaging lens assembly, an Abbe number of the first lens element is V1, an Abbe number of the second lens element is V2, an Abbe number of the third lens element is V3, and they preferably satisfy the relation: $-10 < V1 - V2 - V3 < 20$. When the above relation is satisfied, the chromatic aberration of the assembly can be favorably adjusted and corrected.

In the aforementioned optical imaging lens assembly, an aperture stop is further provided; a distance on an optical axis between the aperture stop and an image plane is SL, a distance on the optical axis between the object-side surface of the first lens element and the image plane is TTL, and they preferably satisfy the relation: 0.92<SL/TTL<1.15. When the above relation is satisfied, the benefits of telecentricity can be obtained while the total track length of the optical imaging lens assembly is not excessively long.

In the aforementioned optical imaging lens assembly, an aperture stop is further provided; a distance on an optical axis between the aperture stop and an image plane is SL, a distance on the optical axis between the object-side surface of the first lens element and the image plane is TTL, and they preferably satisfy the relation: 0.65<SL/TTL<0.92. When the above relation is satisfied, a good balance between telecentricity and the wide field of view can be achieved.

In the aforementioned optical imaging lens assembly, a radius of curvature of the object-side surface of the first lens element is R1, a radius of curvature of the image-side surface of the first lens element is R2, and they preferably satisfy the relation: |R1/R2|<0.35. When the above relation is satisfied, the spherical aberration is corrected favorably.

In the aforementioned optical imaging lens assembly, a thickness of the second lens element on the optical axis is CT2, a focal length of the optical imaging lens assembly is f, and they preferably satisfy the relation: 3.0<(CT2/f)*100<9.3. When the above relation is satisfied, the thickness of the second lens element is more suitable and thereby the complexity of manufacturing can be reduced for better yield rate of lens production.

In the aforementioned optical imaging lens assembly, an on-axis spacing between the second lens element and the third lens element is T23, a focal length of the optical imaging lens assembly is f, and they preferably satisfy the relation: 0.40<(T23/f)*10<1.75. When the above relation is satisfied, the spacing between lens elements of the assembly is more appropriate, which is not only good for the arrangement of lens elements but also a good use of space for the lens assembly and keeping the lens assembly compact.

In the aforementioned optical imaging lens assembly, a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, a radius of curvature of the object-side surface of the fifth lens element is R9, a radius of curvature of the image-side surface of the fifth lens element is R10, and they preferably satisfy the relation: 0.5<R5/R6<1.8; 0.5<R7/R8<1.8; and 0.5<R9/R10<1.8. When the above relation is satisfied, the curvature of the third, fourth and fifth lens elements is not excessively large, which is favorable for manufacturing and assembling lens elements as well as correcting the astigmatism of the lens assembly.

In the aforementioned optical imaging lens assembly, an electronic sensor positioned on an image plane is further provided; a distance on an optical axis between the object-side surface of the first lens element and the image plane is TTL, half of a diagonal length of an effective pixel area of the electronic sensor is ImgH, and they preferably satisfy the relation: TTL/ImgH<2.0. When the above relation is satisfied, it is favorable for keeping the optical imaging lens system compact so that the optical imaging lens system can be installed in compact electronic products.

On the other hand, the present invention provides an optical imaging lens assembly comprising five lens elements with refractive power, in order from an object side to an image side: a first lens element with positive refractive power having a convex object-side surface; a second lens element with negative refractive power; a third lens element with negative refractive power; a fourth lens element having a convex object-side surface and a concave image-side surface, and at least one of the object-side and image-side surfaces thereof being aspheric; and a fifth lens element having a concave image-side surface, at least one of the object-side and image-side surfaces thereof being aspheric, and at least one inflection point is formed on at least one of the object-side and image-side surfaces thereof; wherein a focal length of the second lens element is f2, a focal length of the third lens element is f3, the optical imaging lens assembly further comprises an aperture stop, a distance on an optical axis between the aperture stop and an image plane is SL, a distance on the optical axis between the object-side surface of the first lens element and the image plane is TTL, and they satisfy the relation: 0<f2/f3<1.7; and 0.65<SL/TTL<0.92.

When the relation of 0<f2/f3<1.7 is satisfied, the distribution of the negative refractive power of the second and the third lens elements is more suitable for reducing the sensitivity and correcting the aberration of the assembly effectively, preferably, the following relation is satisfied: 0<f2/f3<0.7.

When the relation of 0.65<SL/TTL<0.92 is satisfied, a good balance between telecentricity and the wide field of view can be achieved.

In the aforementioned optical imaging lens assembly, a focal length of the optical imaging lens assembly is f, a focal length of the third lens element is f3, a focal length of the fourth lens element is f4, a focal length of the fifth lens element is f5, and they preferably satisfy the relation: 0<|f/f3|+|f/f4|+|f/f5|<0.8. When the above relation is satisfied, the refractive power of the third, fourth and fifth lens elements is adjusted well and thereby the sensitivity of the assembly can be reduced.

In the aforementioned optical imaging lens assembly, a focal length of the third lens element is f3, a focal length of the fourth lens element is f4, and they preferably satisfy the relation: |f3/f4|<0.90.

In the aforementioned optical imaging lens assembly, an Abbe number of the first lens element is V1, an Abbe number of the second lens element is V2, and they preferably satisfy the relation: 30<V1−V2<42. When the above relation is satisfied, the chromatic aberration of the assembly can be favorably corrected.

In the aforementioned optical imaging lens assembly, an on-axis spacing between the second lens element and the third lens element is T23, a focal length of the optical imaging lens assembly is f, and they preferably satisfy the relation: 0.40<(T23/f)*10<1.75. When the above relation is satisfied, the spacing between lens elements of the assembly is more appropriate, which is not only good for lens elements arrangement but also a good use of space for the lens assembly and keeping the lens assembly compact.

In the aforementioned optical imaging lens assembly, a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, a radius of curvature of the object-side surface of the fifth lens element is R9, a radius of curvature of the image-side surface of the fifth lens element is R10, and they preferably satisfy the relation: 0.5<R5/R6<1.8; 0.5<R7/R8<1.8; and 0.5<R9/R10<1.8. When the above relation is satisfied, the curvature of the third, fourth and fifth lens elements is not excessively large, which is favorable for manufacturing and assembling of lens elements as well as correcting the astigmatism of the lens assembly.

In the aforementioned optical imaging lens assembly, an Abbe number of the first lens element is V1, an Abbe number of the second lens element is V2, an Abbe number of the third lens element is V3, and they preferably satisfy the relation: −10<V1−V2−V3<20. When the above relation is satisfied, the chromatic aberration of the assembly can be favorably adjusted and corrected.

In the aforementioned optical imaging lens assembly, an electronic sensor positioned on an image plane is further provided; a distance on an optical axis between the object-side surface of the first lens element and the image plane is TTL, half of a diagonal length of an effective pixel area of the electronic sensor is ImgH, and they preferably satisfy the relation: TTL/ImgH<2.0. When the above relation is satisfied, it is favorable for keeping the optical imaging lens system compact so that the optical imaging lens system can be installed in compact electronic products.

In the aforementioned optical imaging lens assembly, the lens elements can be made of glass or plastic material. If the lens elements are made of glass, the freedom for distributing the refractive power of the optical imaging lens assembly can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the optical imaging lens assembly can be effectively reduced.

In the present optical imaging lens assembly, if a lens element is described to have a convex surface, it means the portion of the surface in proximity to the optical axis is convex; if a lens element is described to have a concave surface, it means the portion of the surface in proximity to the optical axis is concave.

In the present optical imaging lens assembly, one or more stops can be utilized in an optical system when necessary to eliminate unwanted light rays (such as flare stops), to adjust the field of view (such as field stops), or for other means to improve the image quality.

Preferred embodiments of the present invention will be described in the following paragraphs by referring to the accompanying drawings.

Embodiment 1

Figure 1B:
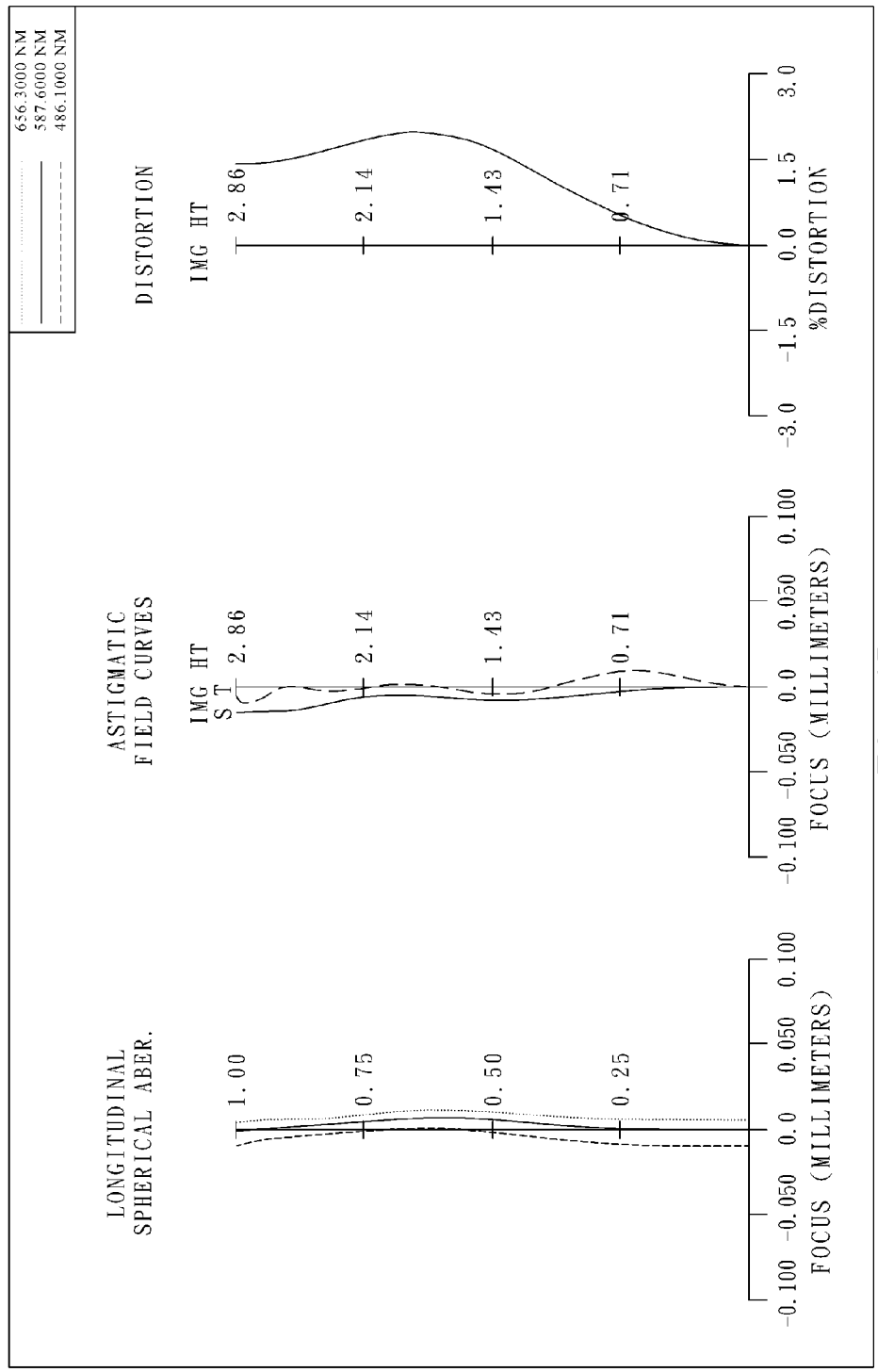
FIG. 1B shows the aberration curves of the first embodiment of the present invention.

FIG. 1A shows an optical imaging lens assembly in accordance with the first embodiment of the present invention, and FIG. 1B shows the aberration curves of the first embodiment of the present invention. The optical imaging lens assembly of the first embodiment of the present invention mainly comprises five lens elements, in order from an object side to an image side:

a plastic first lens element 110 with positive refractive power having a convex object-side surface 111 and a convex image-side surface 112, the object-side and image-side surfaces 111 and 112 thereof being aspheric;

a plastic second lens element 120 with negative refractive power having a concave object-side surface 121 and a concave image-side surface 122, the object-side and image-side surfaces 121 and 122 thereof being aspheric;

a plastic third lens element 130 with negative refractive power having a concave object-side surface 131 and a convex image-side surface 132, the object-side and image-side surfaces 131 and 132 thereof being aspheric;

a plastic fourth lens element 140 with negative refractive power having a convex object-side surface 141 and a concave image-side surface 142, the object-side and image-side surfaces 141 and 142 thereof being aspheric, and at least one inflection point is form on both the object-side and image-side surfaces 141 and 142 thereof; and a plastic fifth lens element 150 with positive refractive power having a convex object-side surface 151 and a concave image-side surface 152, the object-side and image-side surfaces 151 and 152 thereof being aspheric, and at least one inflection point is form on both the object-side and image-side surfaces 151 and 152 thereof;

wherein an aperture stop 100 is disposed between the first lens element 110 and the second lens element 120;

the optical imaging lens assembly further comprises an IR filter 160 disposed between the image-side surface 152 of the fifth lens element 150 and an image plane 170, and the IR filter 160 is made of glass and has no influence on the focal length of the optical imaging lens assembly; the optical imaging lens assembly further comprises an electronic sensor provided on the image plane 170.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical imaging lens assembly, the focal length of the optical imaging lens assembly is f, and it satisfies the relation: f=4.52 (mm).

In the first embodiment of the present optical imaging lens assembly, the f-number of the optical imaging lens assembly is Fno, and it satisfies the relation: Fno=2.40.

In the first embodiment of the present optical imaging lens assembly, half of the maximal field of view of the optical imaging lens assembly is HFOV, and it satisfies the relation: HFOV=32.0 deg.

In the first embodiment of the present optical imaging lens assembly, the Abbe number of the first lens element 110 is V1, the Abbe number of the second lens element 120 is V2, and they satisfy the relation: V1−V2=32.5.

In the first embodiment of the present optical imaging lens assembly, the Abbe number of the first lens element 110 is V1, the Abbe number of the second lens element 120 is V2, the Abbe number of the third lens element 130 is V3, and they satisfy the relation: V1−V2−V3=9.1.

In the first embodiment of the present optical imaging lens assembly, the radius of curvature of the object-side surface 111 of the first lens element 110 is R1, the radius of curvature of the image-side surface 112 of the first lens element 110 is R2, and they satisfy the relation: |R1/R2|=0.03.

In the first embodiment of the present optical imaging lens assembly, the radius of curvature of the object-side surface 131 of the third lens element 130 is R5, the radius of curvature of the image-side surface 132 of the third lens element 130 is R6, and they satisfy the relation: R5/R6=0.79.

In the first embodiment of the present optical imaging lens assembly, the radius of curvature of the object-side surface 141 of the fourth lens element 140 is R7, the radius of curvature of the image-side surface 142 of the fourth lens element 140 is R8, and they satisfy the relation: R7/R8=1.14.

In the first embodiment of the present optical imaging lens assembly, the radius of curvature of the object-side surface 151 of the fifth lens element 150 is R9, the radius of curvature of the image-side surface 152 of the fifth lens element 150 is R10, and they satisfy the relation: R9/R10=1.06.

In the first embodiment of the present optical imaging lens assembly, the thickness of the second lens element 120 on the optical axis is CT2, a focal length of the optical imaging lens assembly is f, and they satisfy the relation: (CT2/f)*100=6.19.

In the first embodiment of the present optical imaging lens assembly, the on-axis spacing between the second lens element 120 and the third lens element 130 is T23, a focal length of the optical imaging lens assembly is f, and they satisfy the relation: (T23/f)*10=1.44.

In the first embodiment of the present optical imaging lens assembly, the focal length of the second lens element 120 is f2, the focal length of the third lens element 130 is f3, and they satisfy the relation: f2/f3=0.26.

In the first embodiment of the present optical imaging lens assembly, the focal length of the third lens element 130 is f3, the focal length of the fourth lens element 140 is f4, and they satisfy the relation: |f3/f4|=0.26.

In the first embodiment of the present optical imaging lens assembly, a focal length of the optical imaging lens assembly is f, a focal length of the third lens element 130 is f3, a focal length of the fourth lens element 140 is f4, a focal length of the fifth lens element 150 is f5, and they satisfy the relation: |f/f3|+|f/f4|+|f/f5|=0.34.

In the first embodiment of the present optical imaging lens assembly, the distance on the optical axis between the aperture stop 100 and the electronic sensor is SL, the distance on the optical axis between the object-side surface 111 of the first lens element 100 and the electronic sensor is TTL, and they satisfy the relation: SL/TTL=0.85.

In the first embodiment of the present optical imaging lens assembly, the distance on the optical axis between the object-side surface 111 of the first lens element 110 and the electronic sensor is TTL, half of the diagonal length of the effective pixel area of the electronic sensor is ImgH, and they preferably satisfy the relation: TTL/ImgH=1.82.

The detailed optical data of the first embodiment is shown in FIG. 11 (TABLE 1), and the aspheric surface data is shown in FIG. 12 (TABLE 2), wherein the units of the radius of curvature, the thickness and the focal length are expressed in mm, and HFOV is half of the maximal field of view.

Embodiment 2

Figure 2A:
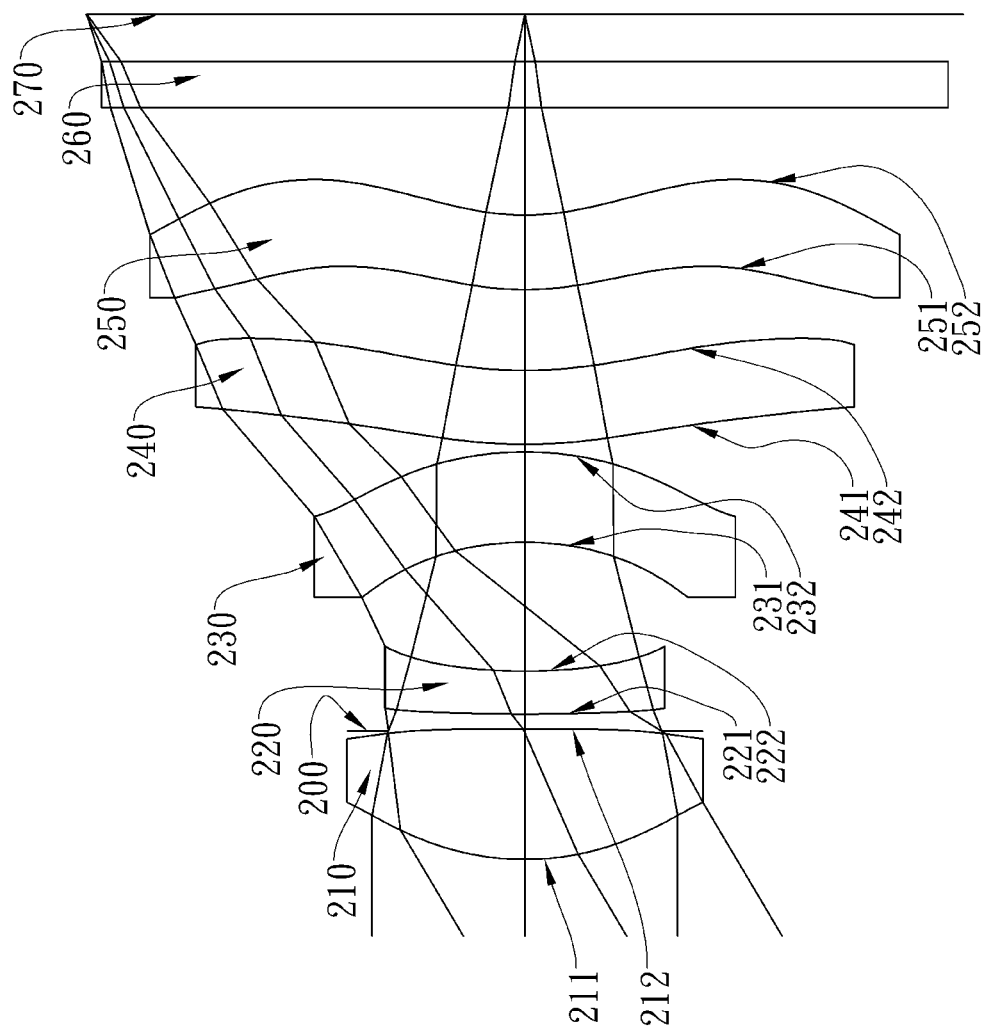
FIG. 2A shows an optical imaging lens assembly in accordance with a second embodiment of the present invention.
Figure 2B:
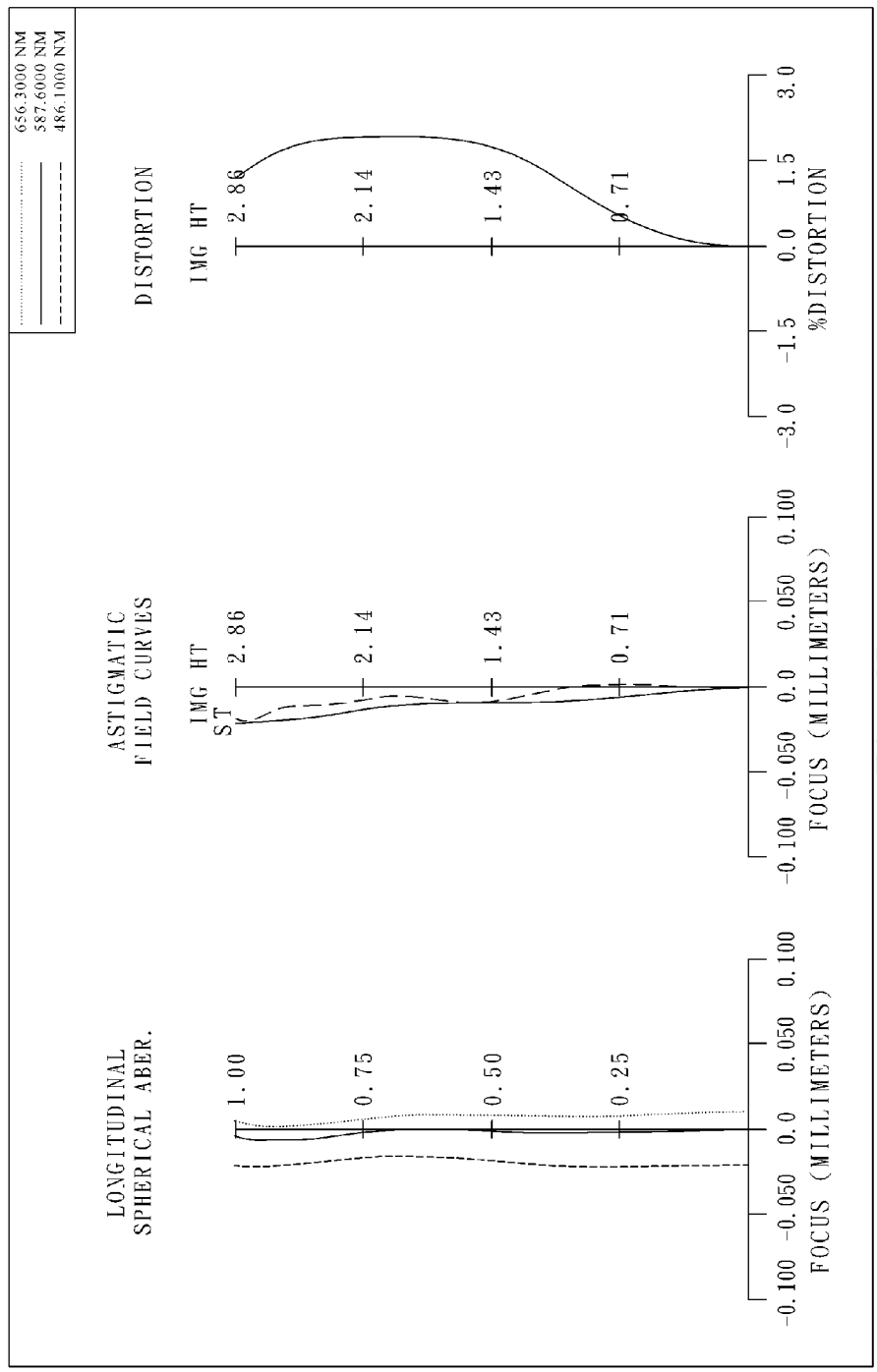
FIG. 2B shows the aberration curves of the second embodiment of the present invention.

FIG. 2A shows an optical imaging lens assembly in accordance with the second embodiment of the present invention, and FIG. 2B shows the aberration curves of the second embodiment of the present invention. The optical imaging lens assembly of the second embodiment of the present invention mainly comprises five lens elements, in order from an object side to an image side:

a plastic first lens element 210 with positive refractive power having a convex object-side surface 211 and a concave image-side surface 212, the object-side and image-side surfaces 211 and 212 thereof being aspheric;

a plastic second lens element 220 with negative refractive power having a convex object-side surface 221 and a concave image-side surface 222, the object-side and image-side surfaces 221 and 222 thereof being aspheric;

a plastic third lens element 230 with negative refractive power having a concave object-side surface 231 and a convex image-side surface 232, the object-side and image-side surfaces 231 and 232 thereof being aspheric;

a plastic fourth lens element 240 with negative refractive power having a convex object-side surface 241 and a concave image-side surface 242, the object-side and image-side surfaces 241 and 242 thereof being aspheric, and at least one inflection point is form on both the object-side and image-side surfaces 241 and 242 thereof; and a plastic fifth lens element 250 with negative refractive power having a convex object-side surface 251 and a concave image-side surface 252, the object-side and image-side surfaces 251 and 252 thereof being aspheric, and at least one inflection point is form on both the object-side and image-side surfaces 251 and 252 thereof;

wherein an aperture stop 200 is disposed between the first lens element 210 and the second lens element 220;

the optical imaging lens assembly further comprises an IR filter 260 disposed between the image-side surface 252 of the fifth lens element 250 and an image plane 270, and the IR filter 260 is made of glass and has no influence on the focal length of the optical imaging lens assembly; the optical imaging lens assembly further comprises an electronic sensor provided on the image plane 270.

The equation of the aspheric surface profiles of the second embodiment has the same form as that of the first embodiment.

In the second embodiment of the present optical imaging lens assembly, the focal length of the optical imaging lens assembly is f, and it satisfies the relation: f=4.79 (mm).

In the second embodiment of the present optical imaging lens assembly, the f-number of the optical imaging lens assembly is Fno, and it satisfies the relation: Fno=2.40.

In the second embodiment of the present optical imaging lens assembly, half of the maximal field of view of the optical imaging lens assembly is HFOV, and it satisfies the relation: HFOV=30.6 deg.

In the second embodiment of the present optical imaging lens assembly, the Abbe number of the first lens element 210 is V1, the Abbe number of the second lens element 220 is V2, and they satisfy the relation: V1−V2=32.5.

In the second embodiment of the present optical imaging lens assembly, the Abbe number of the first lens element 210 is V1, the Abbe number of the second lens element 220 is V2, the Abbe number of the third lens element 230 is V3, and they satisfy the relation: V1−V2−V3=9.1.

In the second embodiment of the present optical imaging lens assembly, the radius of curvature of the object-side surface 211 of the first lens element 210 is R1, the radius of curvature of the image-side surface 212 of the first lens element 210 is R2, and they satisfy the relation: |R1/R2|=0.01.

In the second embodiment of the present optical imaging lens assembly, the radius of curvature of the object-side surface 231 of the third lens element 230 is R5, the radius of curvature of the image-side surface 232 of the third lens element 230 is R6, and they satisfy the relation: R5/R6=0.86.

In the second embodiment of the present optical imaging lens assembly, the radius of curvature of the object-side surface 241 of the fourth lens element 240 is R7, the radius of curvature of the image-side surface 242 of the fourth lens element 240 is R8, and they satisfy the relation: R7/R8=1.11.

In the second embodiment of the present optical imaging lens assembly, the radius of curvature of the object-side surface 251 of the fifth lens element 250 is R9, the radius of curvature of the image-side surface 252 of the fifth lens element 250 is R10, and they satisfy the relation: R9/R10=1.16.

In the second embodiment of the present optical imaging lens assembly, the thickness of the second lens element 220 on the optical axis is CT2, a focal length of the optical imaging lens assembly is f, and they satisfy the relation: (CT2/f)*100=5.85.

In the second embodiment of the present optical imaging lens assembly, the on-axis spacing between the second lens element 220 and the third lens element 230 is T23, a focal length of the optical imaging lens assembly is f, and they satisfy the relation: (T23/f)*10=1.75.

In the second embodiment of the present optical imaging lens assembly, the focal length of the second lens element 220 is f2, the focal length of the third lens element 230 is f3, and they satisfy the relation: f2/f3=0.10.

In the second embodiment of the present optical imaging lens assembly, the focal length of the third lens element 230 is f3, the focal length of the fourth lens element 240 is f4, and they satisfy the relation: |f3/f4|=0.74.

In the second embodiment of the present optical imaging lens assembly, a focal length of the optical imaging lens assembly is f, a focal length of the third lens element 230 is f3, a focal length of the fourth lens element 240 is f4, a focal length of the fifth lens element 250 is f5, and they satisfy the relation: |f/f3|+|f/f4|+|f/f5|=0.18.

In the second embodiment of the present optical imaging lens assembly, the distance on the optical axis between the aperture stop 200 and the electronic sensor is SL, the distance on the optical axis between the object-side surface 211 of the first lens element 200 and the electronic sensor is TTL, and they satisfy the relation: SL/TTL=0.85.

In the second embodiment of the present optical imaging lens assembly, the distance on the optical axis between the object-side surface 211 of the first lens element 210 and the electronic sensor is TTL, half of the diagonal length of the effective pixel area of the electronic sensor is ImgH, and they preferably satisfy the relation: TTL/ImgH=1.89.

The detailed optical data of the second embodiment is shown in FIG. 13 (TABLE 3), and the aspheric surface data is shown in FIG. 14 (TABLE 4), wherein the units of the radius of curvature, the thickness and the focal length are expressed in mm, and HFOV is half of the maximal field of view.

Embodiment 3

Figure 3A:
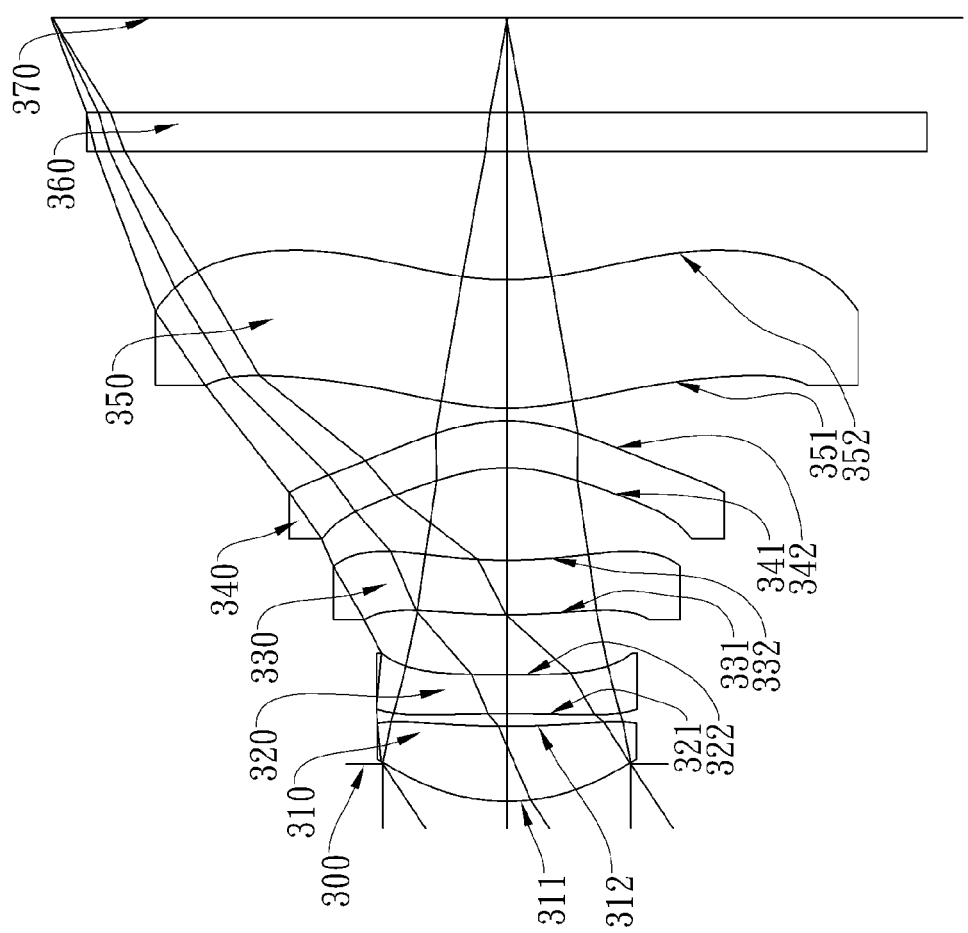
FIG. 3A shows an optical imaging lens assembly in accordance with a third embodiment of the present invention.
Figure 3B:
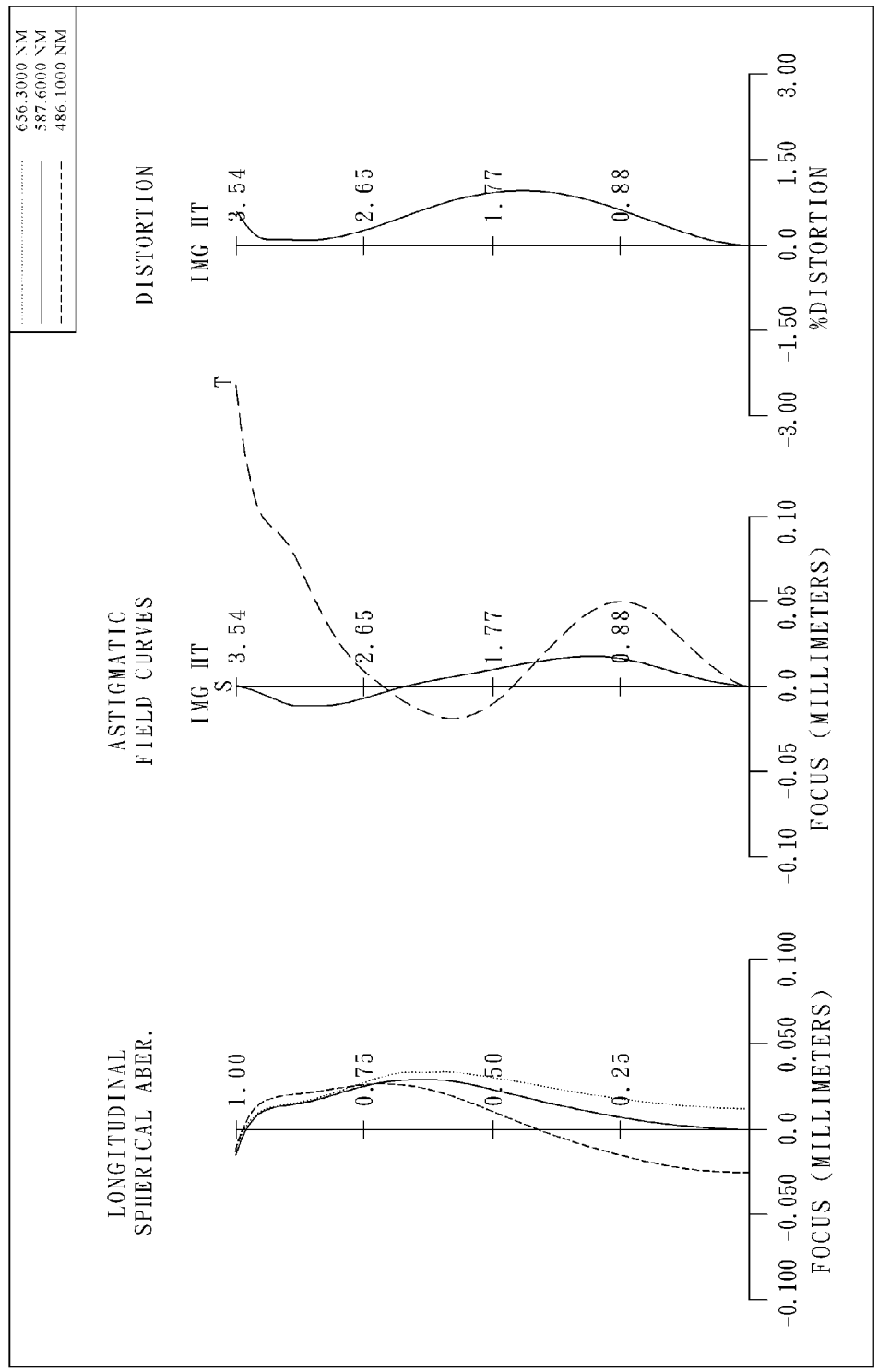
FIG. 3B shows the aberration curves of the third embodiment of the present invention.

FIG. 3A shows an optical imaging lens assembly in accordance with the third embodiment of the present invention, and FIG. 3B shows the aberration curves of the third embodiment of the present invention. The optical imaging lens assembly of the third embodiment of the present invention mainly comprises five lens elements, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a concave object-side surface 321 and a concave image-side surface 322, the object-side and image-side surfaces 321 and 322 thereof being aspheric;

a plastic third lens element 330 with negative refractive power having a convex object-side surface 331 and a concave image-side surface 332, the object-side and image-side surfaces 331 and 332 thereof being aspheric;

a plastic fourth lens element 340 with negative refractive power having a concave object-side surface 341 and a convex image-side surface 342, the object-side and image-side surfaces 341 and 342 thereof being aspheric; and a plastic fifth lens element 350 with positive refractive power having a convex object-side surface 351 and a concave image-side surface 352, the object-side and image-side surfaces 351 and 352 thereof being aspheric, and at least one inflection point is form on both the object-side and image-side surfaces 351 and 352 thereof;

wherein an aperture stop 300 is disposed between an imaged object and the first lens element 310;

the optical imaging lens assembly further comprises an IR filter 360 disposed between the image-side surface 352 of the fifth lens element 350 and an image plane 370, and the IR filter 360 is made of glass and has no influence on the focal length of the optical imaging lens assembly; the optical imaging lens assembly further comprises an electronic sensor provided on the image plane 370.

The equation of the aspheric surface profiles of the third embodiment has the same form as that of the first embodiment.

In the third embodiment of the present optical imaging lens assembly, the focal length of the optical imaging lens assembly is f, and it satisfies the relation: f=5.35 (mm).

In the third embodiment of the present optical imaging lens assembly, the f-number of the optical imaging lens assembly is Fno, and it satisfies the relation: Fno=2.75.

In the third embodiment of the present optical imaging lens assembly, half of the maximal field of view of the optical imaging lens assembly is HFOV, and it satisfies the relation: HFOV=33.5 deg.

In the third embodiment of the present optical imaging lens assembly, the Abbe number of the first lens element 310 is V1, the Abbe number of the second lens element 320 is V2, and they satisfy the relation: V1−V2=32.5.

In the third embodiment of the present optical imaging lens assembly, the Abbe number of the first lens element 310 is V1, the Abbe number of the second lens element 320 is V2, the Abbe number of the third lens element 330 is V3, and they satisfy the relation: V1−V2−V3=9.1.

In the third embodiment of the present optical imaging lens assembly, the radius of curvature of the object-side surface 311 of the first lens element 310 is R1, the radius of curvature of the image-side surface 312 of the first lens element 310 is R2, and they satisfy the relation: |R1/R2|=0.28.

In the third embodiment of the present optical imaging lens assembly, the radius of curvature of the object-side surface 331 of the third lens element 330 is R5, the radius of curvature of the image-side surface 332 of the third lens element 330 is R6, and they satisfy the relation: R5/R6=1.21.

In the third embodiment of the present optical imaging lens assembly, the radius of curvature of the object-side surface 341 of the fourth lens element 340 is R7, the radius of curvature of the image-side surface 342 of the fourth lens element 340 is R8, and they satisfy the relation: R7/R8=0.88.

In the third embodiment of the present optical imaging lens assembly, the radius of curvature of the object-side surface 351 of the fifth lens element 350 is R9, the radius of curvature of the image-side surface 352 of the fifth lens element 350 is R10, and they satisfy the relation: R9/R10=0.96.

In the third embodiment of the present optical imaging lens assembly, the thickness of the second lens element 320 on the optical axis is CT2, a focal length of the optical imaging lens assembly is f, and they satisfy the relation: (CT2/f)*100=5.61.

In the third embodiment of the present optical imaging lens assembly, the on-axis spacing between the second lens element 320 and the third lens element 330 is T23, a focal length of the optical imaging lens assembly is f, and they satisfy the relation: (T23/f)*10=0.88.

In the third embodiment of the present optical imaging lens assembly, the focal length of the second lens element 320 is f2, the focal length of the third lens element 330 is f3, and they satisfy the relation: f2/f3=0.22.

In the third embodiment of the present optical imaging lens assembly, the focal length of the third lens element 330 is f3, the focal length of the fourth lens element 340 is f4, and they satisfy the relation: |f3/f4|=0.53.

In the third embodiment of the present optical imaging lens assembly, a focal length of the optical imaging lens assembly is f, a focal length of the third lens element 330 is f3, a focal length of the fourth lens element 340 is f4, a focal length of the fifth lens element 350 is f5, and they satisfy the relation: |f/f3|+|f/f4|+|f/f5|=0.45.

In the third embodiment of the present optical imaging lens assembly, the distance on the optical axis between the aperture stop 300 and the electronic sensor is SL, the distance on the optical axis between the object-side surface 311 of the first lens element 300 and the electronic sensor is TTL, and they satisfy the relation: SL/TTL=0.95.

In the third embodiment of the present optical imaging lens assembly, the distance on the optical axis between the object-side surface 311 of the first lens element 310 and the electronic sensor is TTL, half of the diagonal length of the effective pixel area of the electronic sensor is ImgH, and they preferably satisfy the relation: TTL/ImgH=1.70.

The detailed optical data of the third embodiment is shown in FIG. 15 (TABLE 5), and the aspheric surface data is shown in FIG. 16 (TABLE 6), wherein the units of the radius of curvature, the thickness and the focal length are expressed in mm, and HFOV is half of the maximal field of view.

Embodiment 4

Figure 4A:
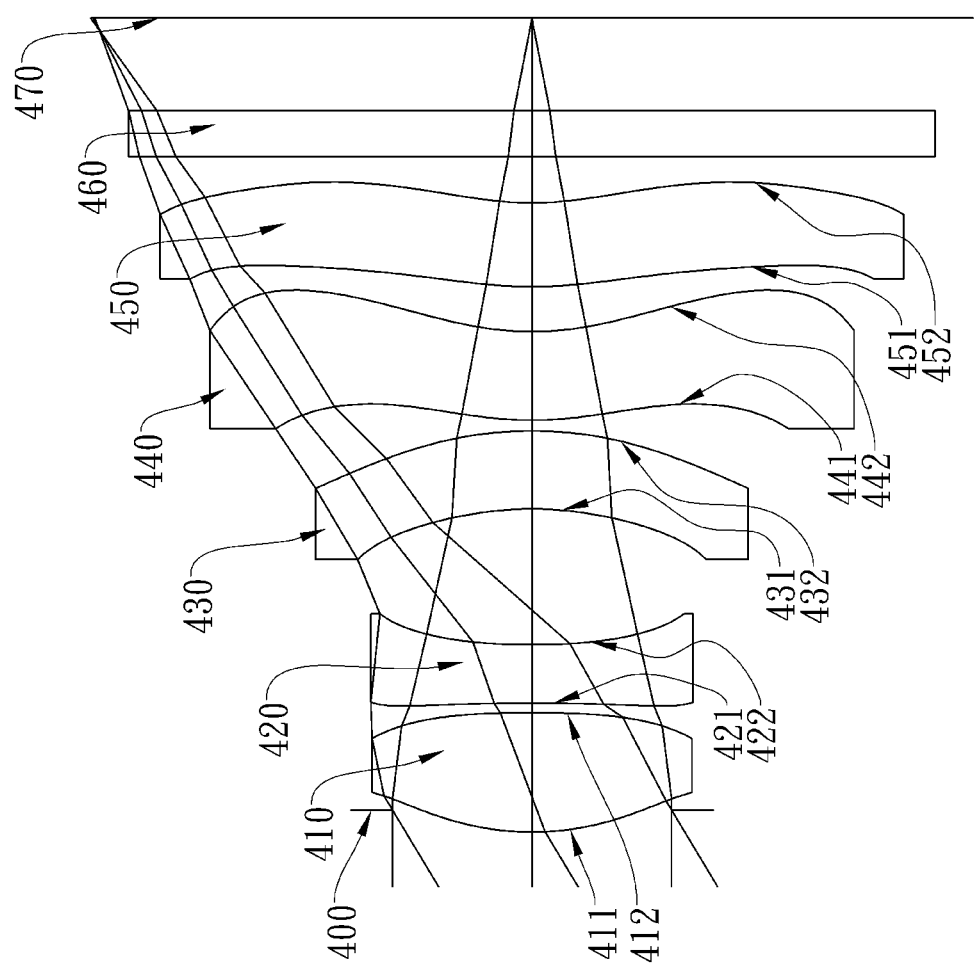
FIG. 4A shows an optical imaging lens assembly in accordance with a fourth embodiment of the present invention.
Figure 4B:
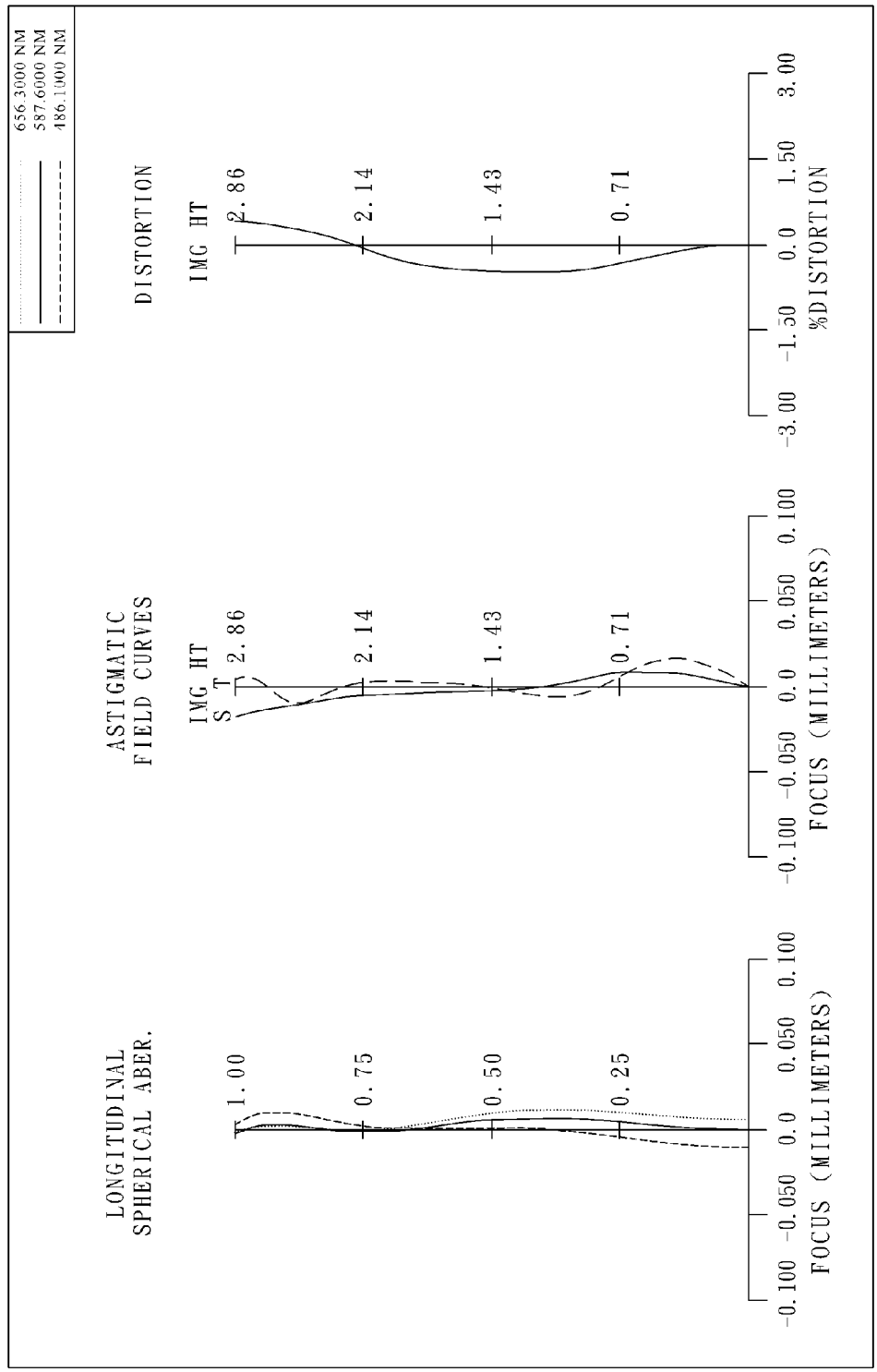
FIG. 4B shows the aberration curves of the fourth embodiment of the present invention.

FIG. 4A shows an optical imaging lens assembly in accordance with the fourth embodiment of the present invention, and FIG. 4B shows the aberration curves of the fourth embodiment of the present invention. The optical imaging lens assembly of the fourth embodiment of the present invention mainly comprises five lens elements, in order from an object side to an image side:

a plastic first lens element 410 with positive refractive power having a convex object-side surface 411 and a convex image-side surface 412, the object-side and image-side surfaces 411 and 412 thereof being aspheric;

a plastic second lens element 420 with negative refractive power having a concave object-side surface 421 and a concave image-side surface 422, the object-side and image-side surfaces 421 and 422 thereof being aspheric;

a plastic third lens element 430 with negative refractive power having a concave object-side surface 431 and a convex image-side surface 432, the object-side and image-side surfaces 431 and 432 thereof being aspheric;

a plastic fourth lens element 440 with negative refractive power having a convex object-side surface 441 and a concave image-side surface 442, the object-side and image-side surfaces 441 and 442 thereof being aspheric, and at least one inflection point is form on both the object-side and image-side surfaces 441 and 442 thereof; and a plastic fifth lens element 450 with negative refractive power having a convex object-side surface 451 and a concave image-side surface 452, the object-side and image-side surfaces 451 and 452 thereof being aspheric, and at least one inflection point is form on both the object-side and image-side surfaces 451 and 452 thereof;

wherein an aperture stop 400 is disposed between an imaged object and the first lens element 410;

the optical imaging lens assembly further comprises an IR filter 460 disposed between the image-side surface 452 of the fifth lens element 450 and an image plane 470, and the IR filter 460 is made of glass and has no influence on the focal length of the optical imaging lens assembly; the optical imaging lens assembly further comprises an electronic sensor provided on the image plane 470.

The equation of the aspheric surface profiles of the fourth embodiment has the same form as that of the first embodiment.

In the fourth embodiment of the present optical imaging lens assembly, the focal length of the optical imaging lens assembly is f, and it satisfies the relation: f=4.76 (mm).

In the fourth embodiment of the present optical imaging lens assembly, the f-number of the optical imaging lens assembly is Fno, and it satisfies the relation: Fno=2.60.

In the fourth embodiment of the present optical imaging lens assembly, half of the maximal field of view of the optical imaging lens assembly is HFOV, and it satisfies the relation: HFOV=31.0 deg.

In the fourth embodiment of the present optical imaging lens assembly, the Abbe number of the first lens element 410 is V1, the Abbe number of the second lens element 420 is V2, and they satisfy the relation: V1−V2=32.5.

In the fourth embodiment of the present optical imaging lens assembly, the Abbe number of the first lens element 410 is V1, the Abbe number of the second lens element 420 is V2, the Abbe number of the third lens element 430 is V3, and they satisfy the relation: V1−V2−V3=−23.4.

In the fourth embodiment of the present optical imaging lens assembly, the radius of curvature of the object-side surface 411 of the first lens element 410 is R1, the radius of curvature of the image-side surface 412 of the first lens element 410 is R2, and they satisfy the relation: |R1/R2|=0.23.

In the fourth embodiment of the present optical imaging lens assembly, the radius of curvature of the object-side surface 431 of the third lens element 430 is R5, the radius of curvature of the image-side surface 432 of the third lens element 430 is R6, and they satisfy the relation: R5/R6=0.83.

In the fourth embodiment of the present optical imaging lens assembly, the radius of curvature of the object-side surface 441 of the fourth lens element 440 is R7, the radius of curvature of the image-side surface 442 of the fourth lens element 440 is R8, and they satisfy the relation: R7/R8=1.20.

In the fourth embodiment of the present optical imaging lens assembly, the radius of curvature of the object-side surface 451 of the fifth lens element 450 is R9, the radius of curvature of the image-side surface 452 of the fifth lens element 450 is R10, and they satisfy the relation: R9/R10=1.27.

In the fourth embodiment of the present optical imaging lens assembly, the thickness of the second lens element 420 on the optical axis is CT2, a focal length of the optical imaging lens assembly is f, and they satisfy the relation: (CT2/f)*100=8.00.

In the fourth embodiment of the present optical imaging lens assembly, the on-axis spacing between the second lens element 420 and the third lens element 430 is T23, a focal length of the optical imaging lens assembly is f, and they satisfy the relation: (T23/f)*10=1.86.

In the fourth embodiment of the present optical imaging lens assembly, the focal length of the second lens element 420 is f2, the focal length of the third lens element 430 is f3, and they satisfy the relation: f2/f3=0.14.

In the fourth embodiment of the present optical imaging lens assembly, the focal length of the third lens element 430 is f3, the focal length of the fourth lens element 440 is f4, and they satisfy the relation: |f3/f4|=0.85.

In the fourth embodiment of the present optical imaging lens assembly, a focal length of the optical imaging lens assembly is f, a focal length of the third lens element 430 is f3, a focal length of the fourth lens element 440 is f4, a focal length of the fifth lens element 450 is f5, and they satisfy the relation: $|f/f3|+|f/f4|+|f/f5|=0.41$.

In the fourth embodiment of the present optical imaging lens assembly, the distance on the optical axis between the aperture stop 400 and the electronic sensor is SL, the distance on the optical axis between the object-side surface 411 of the first lens element 400 and the electronic sensor is TTL, and they satisfy the relation: $SL/TTL=0.97$.

In the fourth embodiment of the present optical imaging lens assembly, the distance on the optical axis between the object-side surface 411 of the first lens element 410 and the electronic sensor is TTL, half of the diagonal length of the effective pixel area of the electronic sensor is ImgH, and they preferably satisfy the relation: $TTL/ImgH=1.82$.

The detailed optical data of the fourth embodiment is shown in FIG. 17 (TABLE 7), and the aspheric surface data is shown in FIG. 18 (TABLE 8), wherein the units of the radius of curvature, the thickness and the focal length are expressed in mm, and HFOV is half of the maximal field of view.

Embodiment 5

Figure 5A:
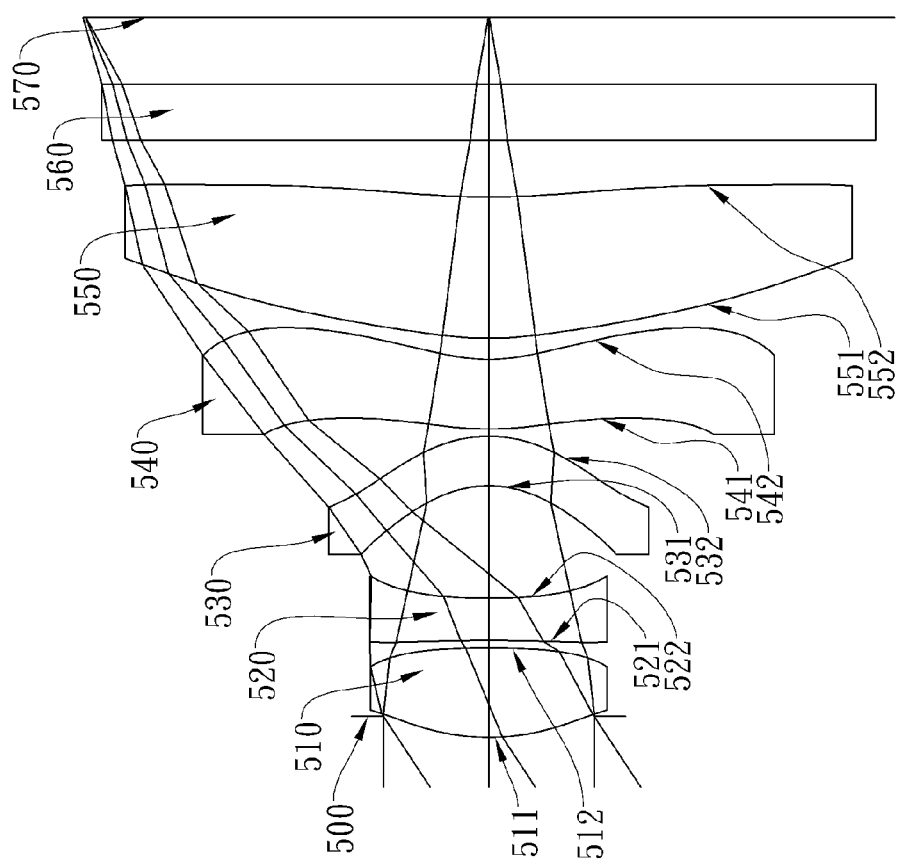
FIG. 5A shows an optical imaging lens assembly in accordance with a fifth embodiment of the present invention.
Figure 5B:
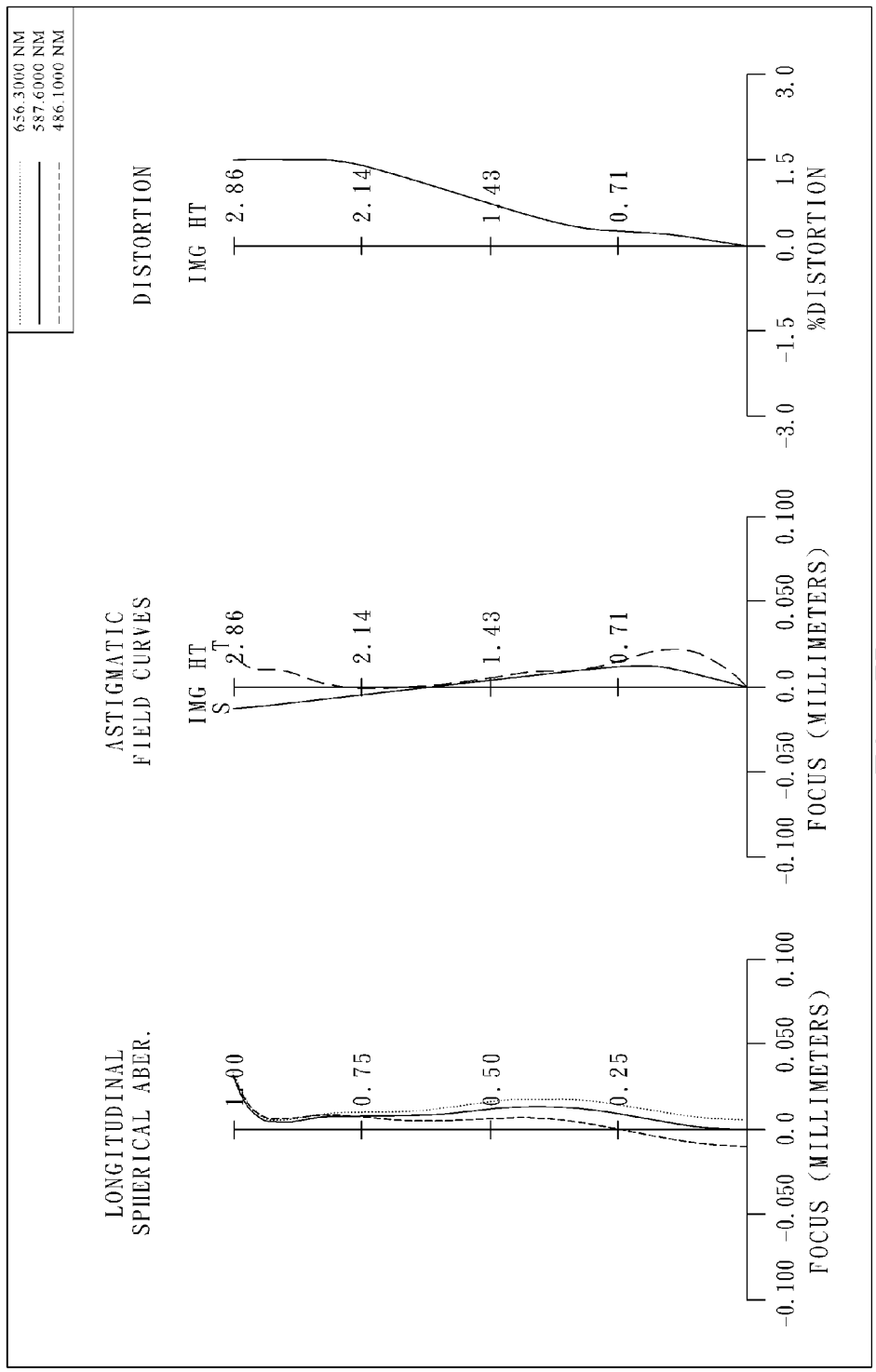
FIG. 5B shows the aberration curves of the fifth embodiment of the present invention.

FIG. 5A shows an optical imaging lens assembly in accordance with the fifth embodiment of the present invention, and FIG. 5B shows the aberration curves of the fifth embodiment of the present invention. The optical imaging lens assembly of the fifth embodiment of the present invention mainly comprises five lens elements, in order from an object side to an image side:

a plastic first lens element 510 with positive refractive power having a convex object-side surface 511 and a convex image-side surface 512, the object-side and image-side surfaces 511 and 512 thereof being aspheric;

a plastic second lens element 520 with negative refractive power having a concave object-side surface 521 and a concave image-side surface 522, the object-side and image-side surfaces 521 and 522 thereof being aspheric;

a plastic third lens element 530 with negative refractive power having a concave object-side surface 531 and a convex image-side surface 532, the object-side and image-side surfaces 531 and 532 thereof being aspheric;

a plastic fourth lens element 540 with negative refractive power having a convex object-side surface 541 and a concave image-side surface 542, the object-side and image-side surfaces 541 and 542 thereof being aspheric, and at least one inflection point is form on both the object-side and image-side surfaces 541 and 542 thereof; and a plastic fifth lens element 550 with positive refractive power having a convex object-side surface 551 and a concave image-side surface 552, the object-side and image-side surfaces 551 and 552 thereof being aspheric, and at least one inflection point is form on the image-side surface 552 thereof;

wherein an aperture stop 500 is disposed between an imaged object and the first lens element 510;

the optical imaging lens assembly further comprises an IR filter 560 disposed between the image-side surface 552 of the fifth lens element 550 and an image plane 570, and the IR filter 560 is made of glass and has no influence on the focal length of the optical imaging lens assembly; the optical imaging lens assembly further comprises an electronic sensor provided on the image plane 570.

The equation of the aspheric surface profiles of the fifth embodiment has the same form as that of the first embodiment.

In the fifth embodiment of the present optical imaging lens assembly, the focal length of the optical imaging lens assembly is f, and it satisfies the relation: $f=4.29$ (mm).

In the fifth embodiment of the present optical imaging lens assembly, the f-number of the optical imaging lens assembly is Fno, and it satisfies the relation: $Fno=2.85$.

In the fifth embodiment of the present optical imaging lens assembly, half of the maximal field of view of the optical imaging lens assembly is HFOV, and it satisfies the relation: $HFOV=33.4$ deg.

In the fifth embodiment of the present optical imaging lens assembly, the Abbe number of the first lens element 510 is V1, the Abbe number of the second lens element 520 is V2, and they satisfy the relation: $V1-V2=32.5$.

In the fifth embodiment of the present optical imaging lens assembly, the Abbe number of the first lens element 510 is V1, the Abbe number of the second lens element 520 is V2, the Abbe number of the third lens element 530 is V3, and they satisfy the relation: $V1-V2-V3=-23.4$.

In the fifth embodiment of the present optical imaging lens assembly, the radius of curvature of the object-side surface 511 of the first lens element 510 is R1, the radius of curvature of the image-side surface 512 of the first lens element 510 is R2, and they satisfy the relation: $|R1/R2|=0.24$.

In the fifth embodiment of the present optical imaging lens assembly, the radius of curvature of the object-side surface 531 of the third lens element 530 is R5, the radius of curvature of the image-side surface 532 of the third lens element 530 is R6, and they satisfy the relation: $R5/R6=0.84$.

In the fifth embodiment of the present optical imaging lens assembly, the radius of curvature of the object-side surface 541 of the fourth lens element 540 is R7, the radius of curvature of the image-side surface 542 of the fourth lens element 540 is R8, and they satisfy the relation: $R7/R8=1.76$.

In the fifth embodiment of the present optical imaging lens assembly, the radius of curvature of the object-side surface 551 of the fifth lens element 550 is R9, the radius of curvature of the image-side surface 552 of the fifth lens element 550 is R10, and they satisfy the relation: $R9/R10=0.44$.

In the fifth embodiment of the present optical imaging lens assembly, the thickness of the second lens element 520 on the optical axis is CT2, a focal length of the optical imaging lens assembly is f, and they satisfy the relation: $(CT2/f)*100=6.99$.

In the fifth embodiment of the present optical imaging lens assembly, the on-axis spacing between the second lens element 520 and the third lens element 530 is T23, a focal length of the optical imaging lens assembly is f, and they satisfy the relation: $(T23/f)*10=1.86$.

In the fifth embodiment of the present optical imaging lens assembly, the focal length of the second lens element 520 is f2, the focal length of the third lens element 530 is f3, and they satisfy the relation: $f2/f3=0.07$.

In the fifth embodiment of the present optical imaging lens assembly, the focal length of the third lens element 530 is f3, the focal length of the fourth lens element 540 is f4, and they satisfy the relation: $|f3/f4|=10.98$.

In the fifth embodiment of the present optical imaging lens assembly, a focal length of the optical imaging lens assembly is f, a focal length of the third lens element 530 is f3, a focal length of the fourth lens element 540 is f4, a focal length of the fifth lens element 550 is f5, and they satisfy the relation: $|f/f3|+|f/f4|+|f/f5|=1.45$.

In the fifth embodiment of the present optical imaging lens assembly, the distance on the optical axis between the aperture stop 500 and the electronic sensor is SL, the distance on the optical axis between the object-side surface 511 of the first lens element 500 and the electronic sensor is TTL, and they satisfy the relation: $SL/TTL=0.97$.

In the fifth embodiment of the present optical imaging lens assembly, the distance on the optical axis between the object-side surface 511 of the first lens element 510 and the electronic sensor is TTL, half of the diagonal length of the effective pixel area of the electronic sensor is ImgH, and they preferably satisfy the relation: TTL/ImgH=1.74.

The detailed optical data of the fifth embodiment is shown in FIG. 19 (TABLE 9), and the aspheric surface data is shown in FIG. 20 (TABLE 10), wherein the units of the radius of curvature, the thickness and the focal length are expressed in mm, and HFOV is half of the maximal field of view.

Embodiment 6

Figure 6A:
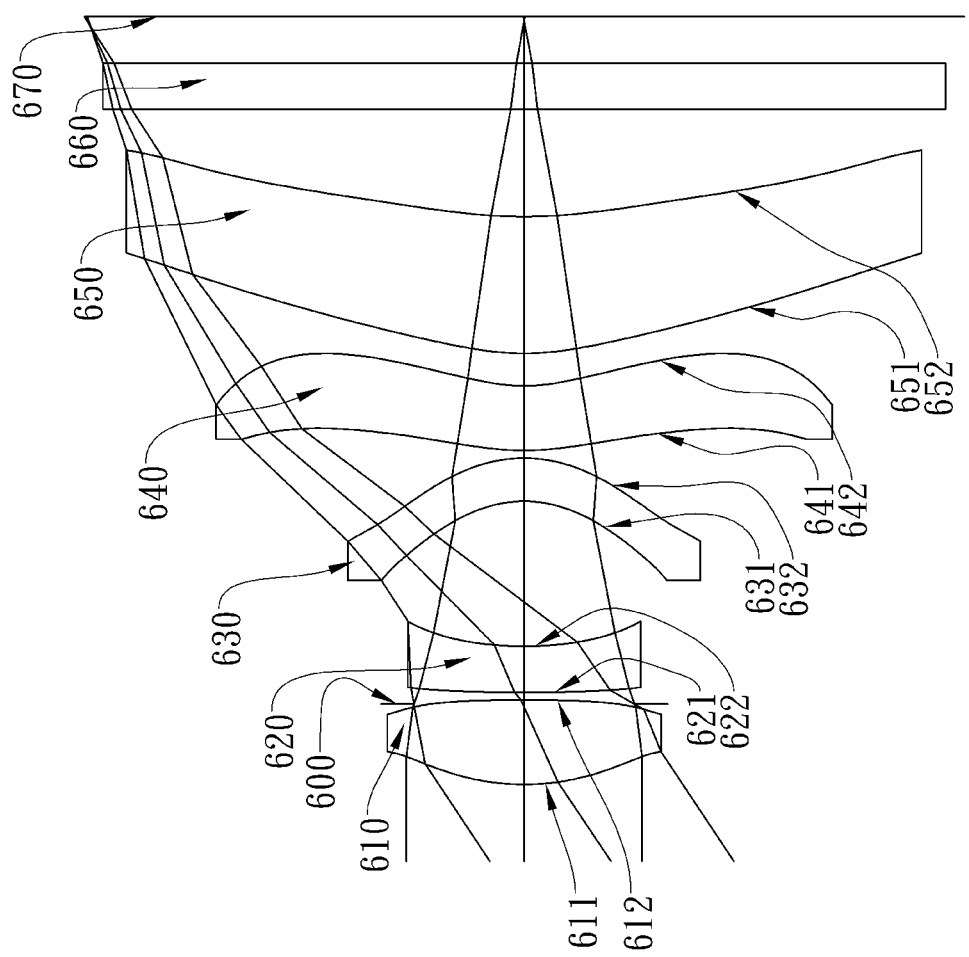
FIG. 6A shows an optical imaging lens assembly in accordance with a sixth embodiment of the present invention.
Figure 6B:
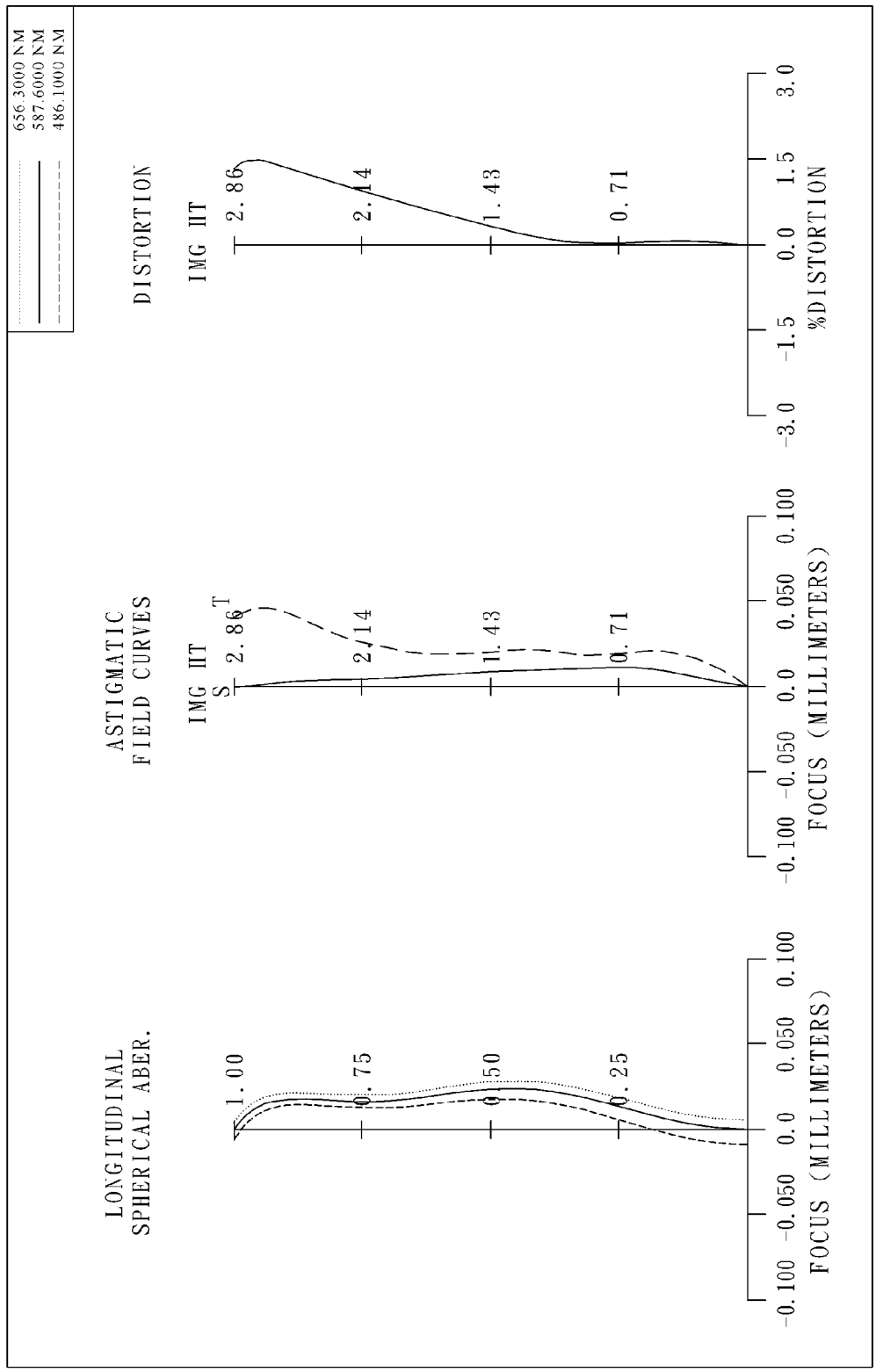
FIG. 6B shows the aberration curves of the sixth embodiment of the present invention.

FIG. 6A shows an optical imaging lens assembly in accordance with the sixth embodiment of the present invention, and FIG. 6B shows the aberration curves of the sixth embodiment of the present invention. The optical imaging lens assembly of the sixth embodiment of the present invention mainly comprises five lens elements, in order from an object side to an image side:

a plastic first lens element 610 with positive refractive power having a convex object-side surface 611 and a convex image-side surface 612, the object-side and image-side surfaces 611 and 612 thereof being aspheric;

a plastic second lens element 620 with negative refractive power having a convex object-side surface 621 and a concave image-side surface 622, the object-side and image-side surfaces 621 and 622 thereof being aspheric;

a plastic third lens element 630 with negative refractive power having a concave object-side surface 631 and a convex image-side surface 632, the object-side and image-side surfaces 631 and 632 thereof being aspheric;

a plastic fourth lens element 640 with negative refractive power having a convex object-side surface 641 and a concave image-side surface 642, the object-side and image-side surfaces 641 and 642 thereof being aspheric, and at least one inflection point is form on both the object-side and image-side surfaces 641 and 642 thereof; and a plastic fifth lens element 650 with positive refractive power having a convex object-side surface 651 and a concave image-side surface 652, the object-side and image-side surfaces 651 and 652 thereof being aspheric, and at least one inflection point is form on both the object-side and image-side surfaces 651 and 652 thereof; and;

wherein an aperture stop 600 is disposed between the first lens element 610 and the second lens element 620;

the optical imaging lens assembly further comprises an IR filter 660 disposed between the image-side surface 652 of the fifth lens element 650 and an image plane 670, and the IR filter 660 is made of glass and has no influence on the focal length of the optical imaging lens assembly; the optical imaging lens assembly further comprises an electronic sensor provided on the image plane 670.

The equation of the aspheric surface profiles of the sixth embodiment has the same form as that of the first embodiment.

In the sixth embodiment of the present optical imaging lens assembly, the focal length of the optical imaging lens assembly is f, and it satisfies the relation: f=4.25 (mm).

In the sixth embodiment of the present optical imaging lens assembly, the f-number of the optical imaging lens assembly is Fno, and it satisfies the relation: Fno=2.78.

In the sixth embodiment of the present optical imaging lens assembly, half of the maximal field of view of the optical imaging lens assembly is HFOV, and it satisfies the relation: HFOV=33.7 deg.

In the sixth embodiment of the present optical imaging lens assembly, the Abbe number of the first lens element 610 is V1, the Abbe number of the second lens element 620 is V2, and they satisfy the relation: V1−V2=32.5.

In the sixth embodiment of the present optical imaging lens assembly, the Abbe number of the first lens element 610 is V1, the Abbe number of the second lens element 620 is V2, the Abbe number of the third lens element 630 is V3, and they satisfy the relation: V1−V2−V3=−23.4.

In the sixth embodiment of the present optical imaging lens assembly, the radius of curvature of the object-side surface 611 of the first lens element 610 is R1, the radius of curvature of the image-side surface 612 of the first lens element 610 is R2, and they satisfy the relation: |R1/R2|=0.12.

In the sixth embodiment of the present optical imaging lens assembly, the radius of curvature of the object-side surface 631 of the third lens element 630 is R5, the radius of curvature of the image-side surface 632 of the third lens element 630 is R6, and they satisfy the relation: R5/R6=0.83.

In the sixth embodiment of the present optical imaging lens assembly, the radius of curvature of the object-side surface 641 of the fourth lens element 640 is R7, the radius of curvature of the image-side surface 642 of the fourth lens element 640 is R8, and they satisfy the relation: R7/R8=1.50.

In the sixth embodiment of the present optical imaging lens assembly, the radius of curvature of the object-side surface 651 of the fifth lens element 650 is R9, the radius of curvature of the image-side surface 652 of the fifth lens element 650 is R10, and they satisfy the relation: R9/R10=0.55.

In the sixth embodiment of the present optical imaging lens assembly, the thickness of the second lens element 620 on the optical axis is CT2, a focal length of the optical imaging lens assembly is f, and they satisfy the relation: (CT2/f)*100=7.08.

In the sixth embodiment of the present optical imaging lens assembly, the on-axis spacing between the second lens element 620 and the third lens element 630 is T23, a focal length of the optical imaging lens assembly is f, and they satisfy the relation: (T23/f)*10=2.22.

In the sixth embodiment of the present optical imaging lens assembly, the focal length of the second lens element 620 is f2, the focal length of the third lens element 630 is f3, and they satisfy the relation: f2/f3=0.19.

In the sixth embodiment of the present optical imaging lens assembly, the focal length of the third lens element 630 is f3, the focal length of the fourth lens element 640 is f4, and they satisfy the relation: |f3/f4|=2.82.

In the sixth embodiment of the present optical imaging lens assembly, a focal length of the optical imaging lens assembly is f, a focal length of the third lens element 630 is f3, a focal length of the fourth lens element 640 is f4, a focal length of the fifth lens element 650 is f5, and they satisfy the relation: |f/f3|+|f/f4|+|f/f5|=1.49.

In the sixth embodiment of the present optical imaging lens assembly, the distance on the optical axis between the aperture stop 600 and the electronic sensor is SL, the distance on the optical axis between the object-side surface 611 of the first lens element 600 and the electronic sensor is TTL, and they satisfy the relation: SL/TTL=0.89.

In the sixth embodiment of the present optical imaging lens assembly, the distance on the optical axis between the object-side surface 611 of the first lens element 610 and the electronic sensor is TTL, half of the diagonal length of the effective pixel area of the electronic sensor is ImgH, and they preferably satisfy the relation: TTL/ImgH=1.72.

The detailed optical data of the sixth embodiment is shown in FIG. 21 (TABLE 11), and the aspheric surface data is shown in FIG. 22 (TABLE 12), wherein the units of the radius of curvature, the thickness and the focal length are expressed in mm, and HFOV is half of the maximal field of view.

Embodiment 7

Figure 7A:
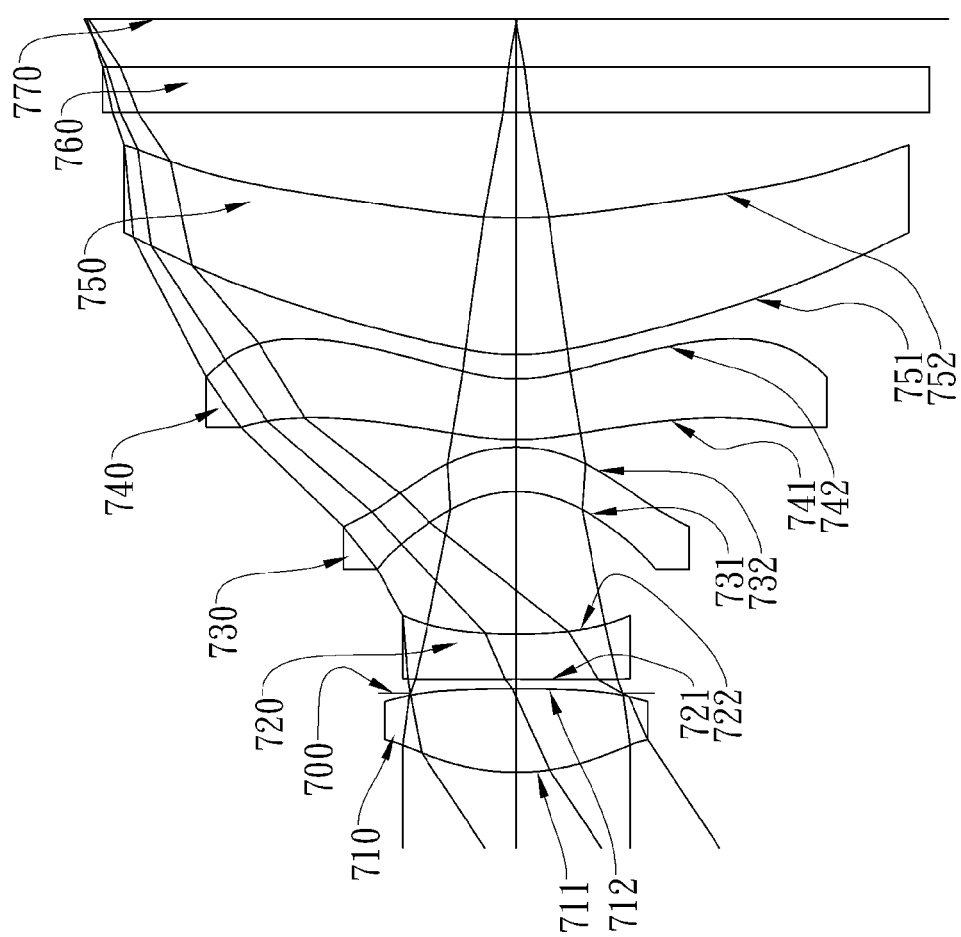
FIG. 7A shows an optical imaging lens assembly in accordance with a seventh embodiment of the present invention.
Figure 7B:
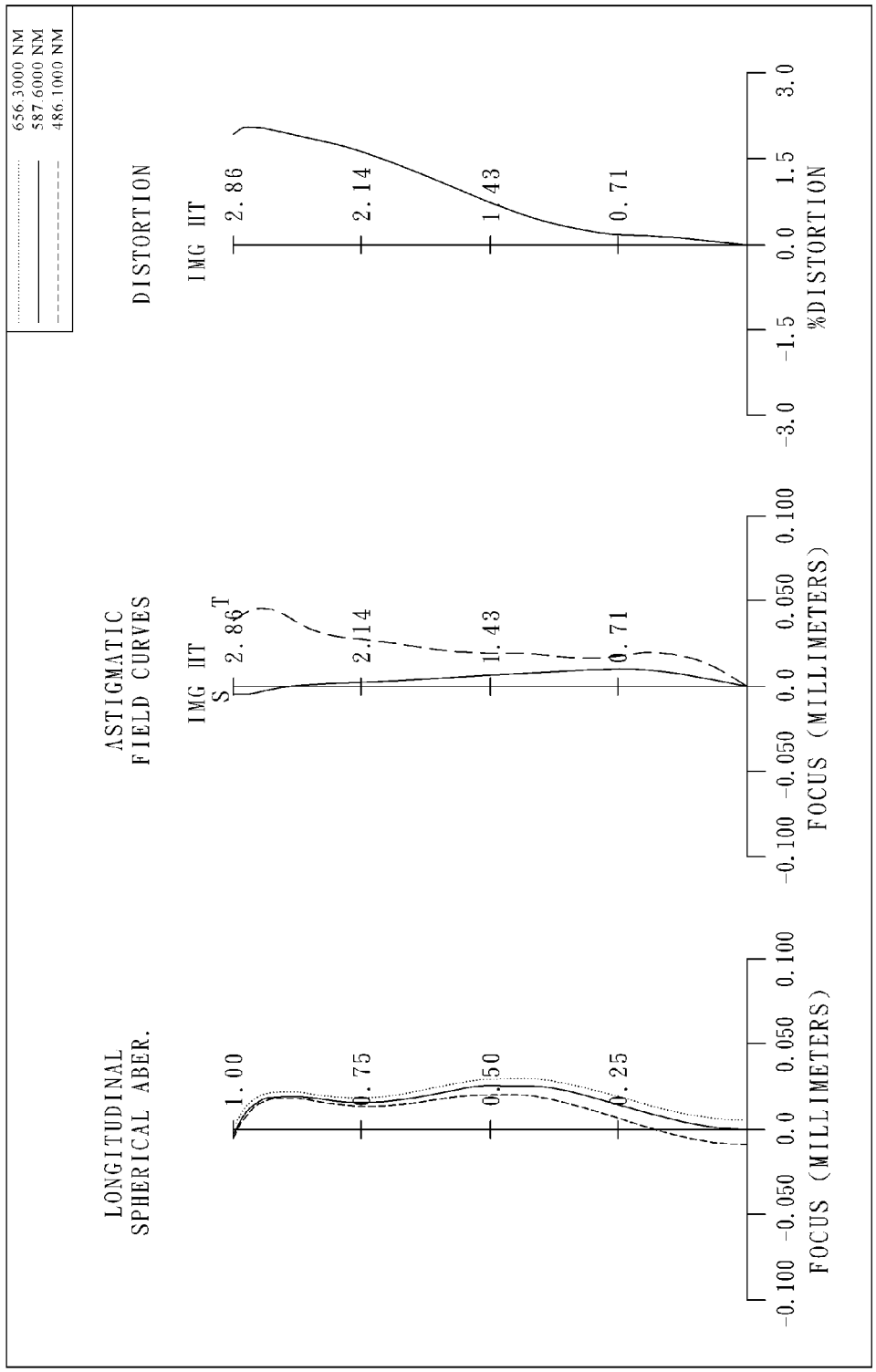
FIG. 7B shows the aberration curves of the seventh embodiment of the present invention.

FIG. 7A shows an optical imaging lens assembly in accordance with the seventh embodiment of the present invention, and FIG. 7B shows the aberration curves of the seventh embodiment of the present invention. The optical imaging lens assembly of the seventh embodiment of the present invention mainly comprises five lens elements, in order from an object side to an image side:

a plastic first lens element 710 with positive refractive power having a convex object-side surface 711 and a convex image-side surface 712, the object-side and image-side surfaces 711 and 712 thereof being aspheric;

a plastic second lens element 720 with negative refractive power having a concave object-side surface 721 and a concave image-side surface 722, the object-side and image-side surfaces 721 and 722 thereof being aspheric;

a plastic third lens element 730 with negative refractive power having a concave object-side surface 731 and a convex image-side surface 732, the object-side and image-side surfaces 731 and 732 thereof being aspheric;

a plastic fourth lens element 740 with negative refractive power having a convex object-side surface 741 and a concave image-side surface 742, the object-side and image-side surfaces 741 and 742 thereof being aspheric, and at least one inflection point is form on both the object-side and image-side surfaces 741 and 742 thereof; and a plastic fifth lens element 750 with positive refractive power having a convex object-side surface 751 and a concave image-side surface 752, the object-side and image-side surfaces 751 and 752 thereof being aspheric, and at least one inflection point is form on both the object-side and image-side surfaces 751 and 752 thereof;

wherein an aperture stop 700 is disposed between the first lens element 710 and the second lens element 720;

the optical imaging lens assembly further comprises an IR filter 760 disposed between the image-side surface 752 of the fifth lens element 750 and an image plane 770, and the IR filter 760 is made of glass and has no influence on the focal length of the optical imaging lens assembly; the optical imaging lens assembly further comprises an electronic sensor provided on the image plane 770.

The equation of the aspheric surface profiles of the seventh embodiment has the same form as that of the first embodiment.

In the seventh embodiment of the present optical imaging lens assembly, the focal length of the optical imaging lens assembly is f, and it satisfies the relation: f=4.24 (mm).

In the seventh embodiment of the present optical imaging lens assembly, the f-number of the optical imaging lens assembly is Fno, and it satisfies the relation: Fno=2.80.

In the seventh embodiment of the present optical imaging lens assembly, half of the maximal field of view of the optical imaging lens assembly is HFOV, and it satisfies the relation: HFOV=33.6 deg.

In the seventh embodiment of the present optical imaging lens assembly, the Abbe number of the first lens element 710 is V1, the Abbe number of the second lens element 720 is V2, and they satisfy the relation: V1−V2=32.5.

In the seventh embodiment of the present optical imaging lens assembly, the Abbe number of the first lens element 710 is V1, the Abbe number of the second lens element 720 is V2, the Abbe number of the third lens element 730 is V3, and they satisfy the relation: V1−V2−V3=−23.4.

In the seventh embodiment of the present optical imaging lens assembly, the radius of curvature of the object-side surface 711 of the first lens element 710 is R1, the radius of curvature of the image-side surface 712 of the first lens element 710 is R2, and they satisfy the relation: |R1/R2|=0.13.

In the seventh embodiment of the present optical imaging lens assembly, the radius of curvature of the object-side surface 731 of the third lens element 730 is R5, the radius of curvature of the image-side surface 732 of the third lens element 730 is R6, and they satisfy the relation: R5/R6=0.84.

In the seventh embodiment of the present optical imaging lens assembly, the radius of curvature of the object-side surface 741 of the fourth lens element 740 is R7, the radius of curvature of the image-side surface 742 of the fourth lens element 740 is R8, and they satisfy the relation: R7/R8=1.66.

In the seventh embodiment of the present optical imaging lens assembly, the radius of curvature of the object-side surface 751 of the fifth lens element 750 is R9, the radius of curvature of the image-side surface 752 of the fifth lens element 750 is R10, and they satisfy the relation: R9/R10=0.49.

In the seventh embodiment of the present optical imaging lens assembly, the thickness of the second lens element 720 on the optical axis is CT2, a focal length of the optical imaging lens assembly is f, and they satisfy the relation: (CT2/f)*100=7.03.

In the seventh embodiment of the present optical imaging lens assembly, the on-axis spacing between the second lens element 720 and the third lens element 730 is T23, a focal length of the optical imaging lens assembly is f, and they satisfy the relation: (T23/f)*10=2.23.

In the seventh embodiment of the present optical imaging lens assembly, the focal length of the second lens element 720 is f2, the focal length of the third lens element 730 is f3, and they satisfy the relation: f2/f3=0.18.

In the seventh embodiment of the present optical imaging lens assembly, the focal length of the third lens element 730 is f3, the focal length of the fourth lens element 740 is f4, and they satisfy the relation: |f3/f4|=4.57.

In the seventh embodiment of the present optical imaging lens assembly, a focal length of the optical imaging lens assembly is f, a focal length of the third lens element 730 is f3, a focal length of the fourth lens element 740 is f4, a focal length of the fifth lens element 750 is f5, and they satisfy the relation: |f/f3|+|f/f4|+|f/f5|=1.84.

In the seventh embodiment of the present optical imaging lens assembly, the distance on the optical axis between the aperture stop 700 and the electronic sensor is SL, the distance on the optical axis between the object-side surface 711 of the first lens element 700 and the electronic sensor is TTL, and they satisfy the relation: SL/TTL=0.89.

In the seventh embodiment of the present optical imaging lens assembly, the distance on the optical axis between the object-side surface 711 of the first lens element 710 and the electronic sensor is TTL, half of the diagonal length of the effective pixel area of the electronic sensor is ImgH, and they preferably satisfy the relation: TTL/ImgH=1.71.

The detailed optical data of the seventh embodiment is shown in FIG. 23 (TABLE 13), and the aspheric surface data is shown in FIG. 24 (TABLE 14), wherein the units of the radius of curvature, the thickness and the focal length are expressed in mm, and HFOV is half of the maximal field of view.

Embodiment 8

Figure 8A:
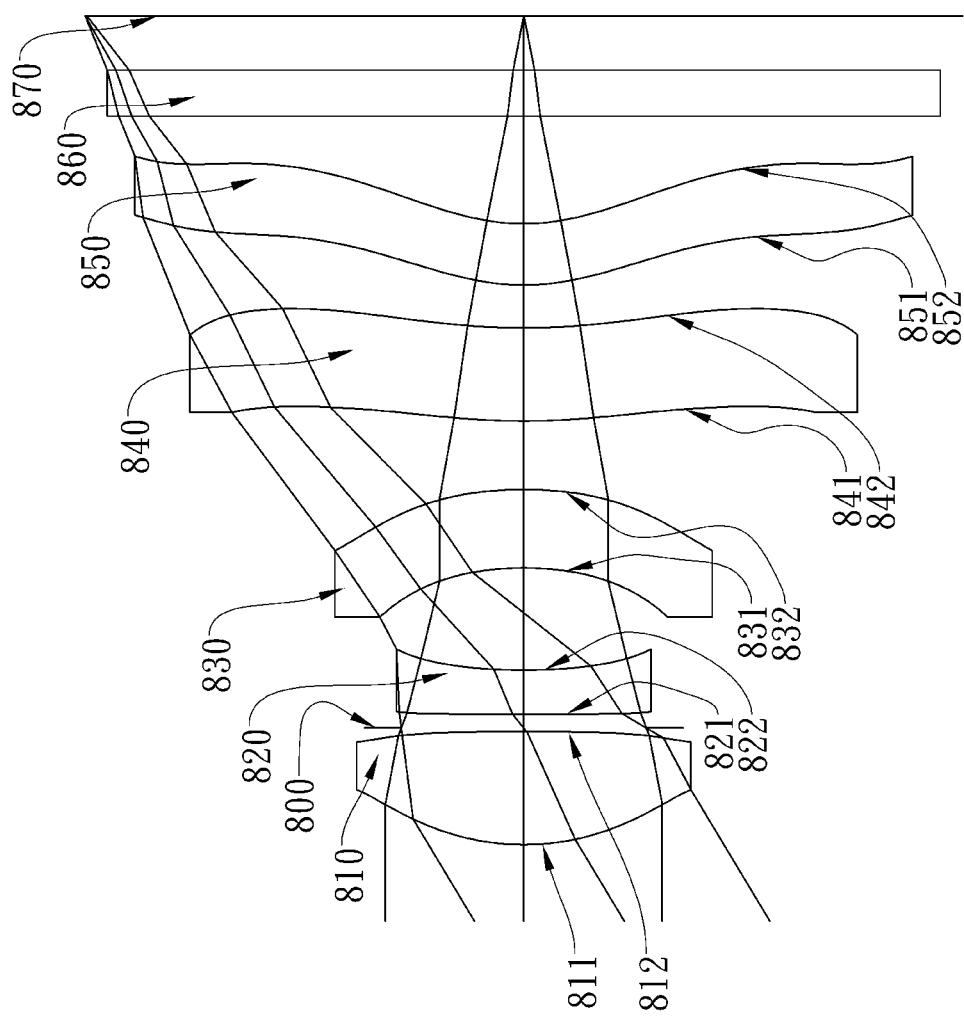
FIG. 8A shows an optical imaging lens assembly in accordance with an eighth embodiment of the present invention.
Figure 8B:
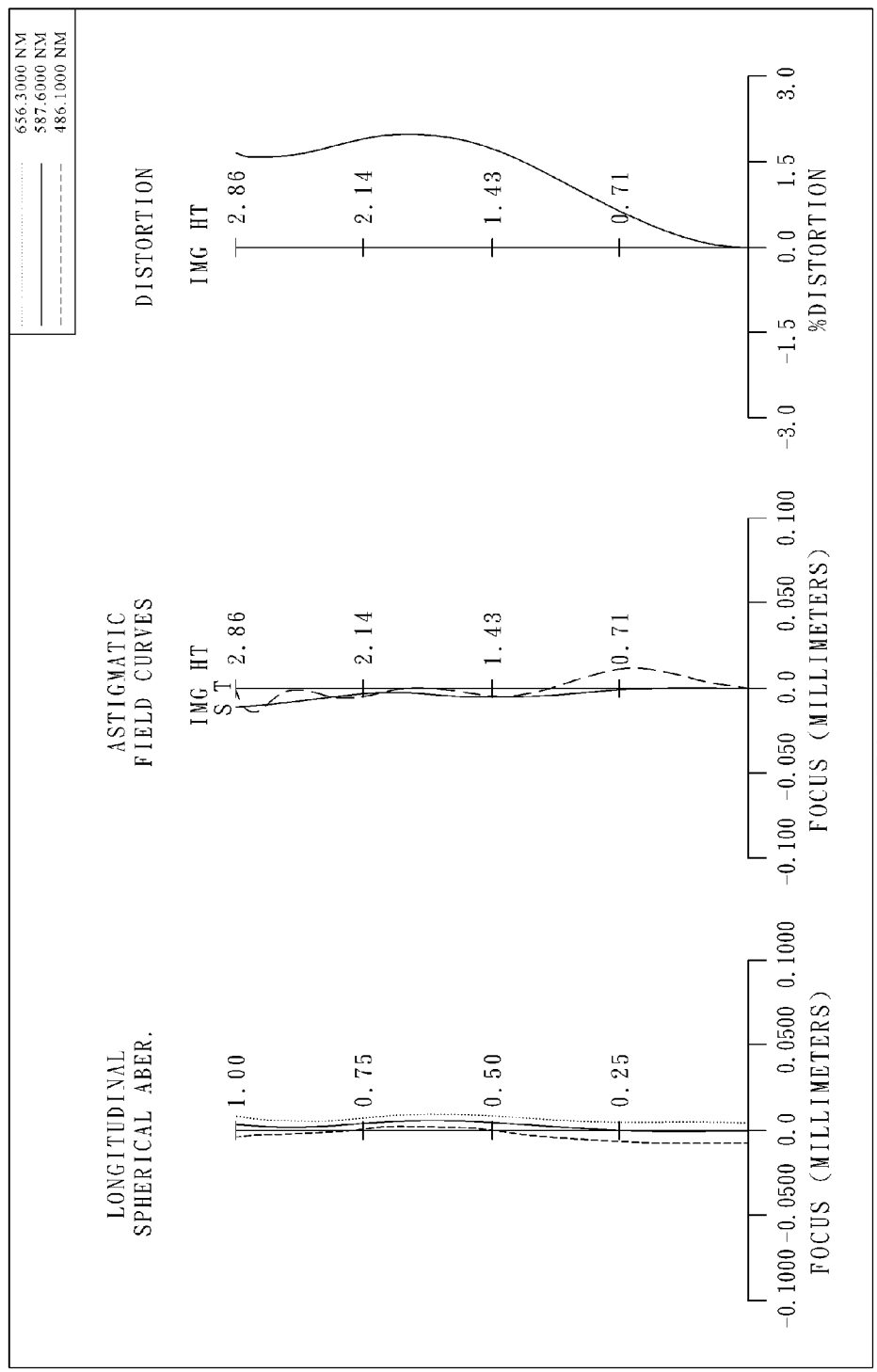
FIG. 8B shows the aberration curves of the eighth embodiment of the present invention.

FIG. 8A shows an optical imaging lens assembly in accordance with the eighth embodiment of the present invention, and FIG. 8B shows the aberration curves of the eighth embodiment of the present invention. The optical imaging lens assembly of the eighth embodiment of the present invention mainly comprises five lens elements, in order from an object side to an image side:

a plastic first lens element 810 with positive refractive power having a convex object-side surface 811 and a convex image-side surface 812, the object-side and image-side surfaces 811 and 812 thereof being aspheric;

a plastic second lens element 820 with negative refractive power having a convex object-side surface 821 and a concave image-side surface 822, the object-side and image-side surfaces 821 and 822 thereof being aspheric;

a plastic third lens element 830 with negative refractive power having a concave object-side surface 831 and a convex image-side surface 832, the object-side and image-side surfaces 831 and 832 thereof being aspheric;

a plastic fourth lens element 840 with positive refractive power having a convex object-side surface 841 and a concave image-side surface 842, the object-side and image-side surfaces 841 and 842 thereof being aspheric, and at least one inflection point is form on both the object-side and image-side surfaces 841 and 842 thereof; and a plastic fifth lens element 850 with positive refractive power having a convex object-side surface 851 and a concave image-side surface 852, the object-side and image-side surfaces 851 and 852 thereof being aspheric, and at least one inflection point is form on both the object-side and image-side surfaces 851 and 852 thereof;

wherein an aperture stop 800 is disposed between the first lens element 810 and the second lens element 820;

the optical imaging lens assembly further comprises an IR filter 860 disposed between the image-side surface 852 of the fifth lens element 850 and an image plane 870, and the IR filter 860 is made of glass and has no influence on the focal length of the optical imaging lens assembly; the optical imaging lens assembly further comprises an electronic sensor provided on the image plane 870.

The equation of the aspheric surface profiles of the eighth embodiment has the same form as that of the first embodiment.

In the eighth embodiment of the present optical imaging lens assembly, the focal length of the optical imaging lens assembly is f, and it satisfies the relation: f=4.72 (mm).

In the eighth embodiment of the present optical imaging lens assembly, the f-number of the optical imaging lens assembly is Fno, and it satisfies the relation: Fno=2.60.

In the eighth embodiment of the present optical imaging lens assembly, half of the maximal field of view of the optical imaging lens assembly is HFOV, and it satisfies the relation: HFOV=30.9 deg.

In the eighth embodiment of the present optical imaging lens assembly, the Abbe number of the first lens element 810 is V1, the Abbe number of the second lens element 820 is V2, and they satisfy the relation: V1−V2=32.5.

In the eighth embodiment of the present optical imaging lens assembly, the Abbe number of the first lens element 810 is V1, the Abbe number of the second lens element 820 is V2, the Abbe number of the third lens element 830 is V3, and they satisfy the relation: V1-V2-V3=9.1.

In the eighth embodiment of the present optical imaging lens assembly, the radius of curvature of the object-side surface 811 of the first lens element 810 is R1, the radius of curvature of the image-side surface 812 of the first lens element 810 is R2, and they satisfy the relation: |R1/R2|=0.03.

In the eighth embodiment of the present optical imaging lens assembly, the radius of curvature of the object-side surface 831 of the third lens element 830 is R5, the radius of curvature of the image-side surface 832 of the third lens element 830 is R6, and they satisfy the relation: R5/R6=0.80.

In the eighth embodiment of the present optical imaging lens assembly, the radius of curvature of the object-side surface 841 of the fourth lens element 840 is R7, the radius of curvature of the image-side surface 842 of the fourth lens element 840 is R8, and they satisfy the relation: R7/R8=1.00.

In the eighth embodiment of the present optical imaging lens assembly, the radius of curvature of the object-side surface 851 of the fifth lens element 850 is R9, the radius of curvature of the image-side surface 852 of the fifth lens element 850 is R10, and they satisfy the relation: R9/R10=1.09.

In the eighth embodiment of the present optical imaging lens assembly, the thickness of the second lens element 820 on the optical axis is CT2, a focal length of the optical imaging lens assembly is f, and they satisfy the relation: (CT2/f)*100=6.06.

In the eighth embodiment of the present optical imaging lens assembly, the on-axis spacing between the second lens element 820 and the third lens element 830 is T23, a focal length of the optical imaging lens assembly is f, and they satisfy the relation: (T23/f)*10=1.41.

In the eighth embodiment of the present optical imaging lens assembly, the focal length of the second lens element 820 is f2, the focal length of the third lens element 830 is f3, and they satisfy the relation: f2/f3=0.23.

In the eighth embodiment of the present optical imaging lens assembly, the focal length of the third lens element 830 is f3, the focal length of the fourth lens element 840 is f4, and they satisfy the relation: |f3/f4|=0.17.

In the eighth embodiment of the present optical imaging lens assembly, a focal length of the optical imaging lens assembly is f, a focal length of the third lens element 830 is f3, a focal length of the fourth lens element 840 is f4, a focal length of the fifth lens element 850 is f5, and they satisfy the relation: |f/f3|+|f/f4|+|f/f5|=0.24.

In the eighth embodiment of the present optical imaging lens assembly, the distance on the optical axis between the aperture stop 800 and the electronic sensor is SL, the distance on the optical axis between the object-side surface 811 of the first lens element 800 and the electronic sensor is TTL, and they satisfy the relation: SL/TTL=0.86.

In the eighth embodiment of the present optical imaging lens assembly, the distance on the optical axis between the object-side surface 811 of the first lens element 810 and the electronic sensor is TTL, half of the diagonal length of the effective pixel area of the electronic sensor is ImgH, and they preferably satisfy the relation: TTL/ImgH=1.86.

The detailed optical data of the eighth embodiment is shown in FIG. 25 (TABLE 15), and the aspheric surface data is shown in FIG. 26 (TABLE 16), wherein the units of the radius of curvature, the thickness and the focal length are expressed in mm, and HFOV is half of the maximal field of view.

Embodiment 9

Figure 9A:
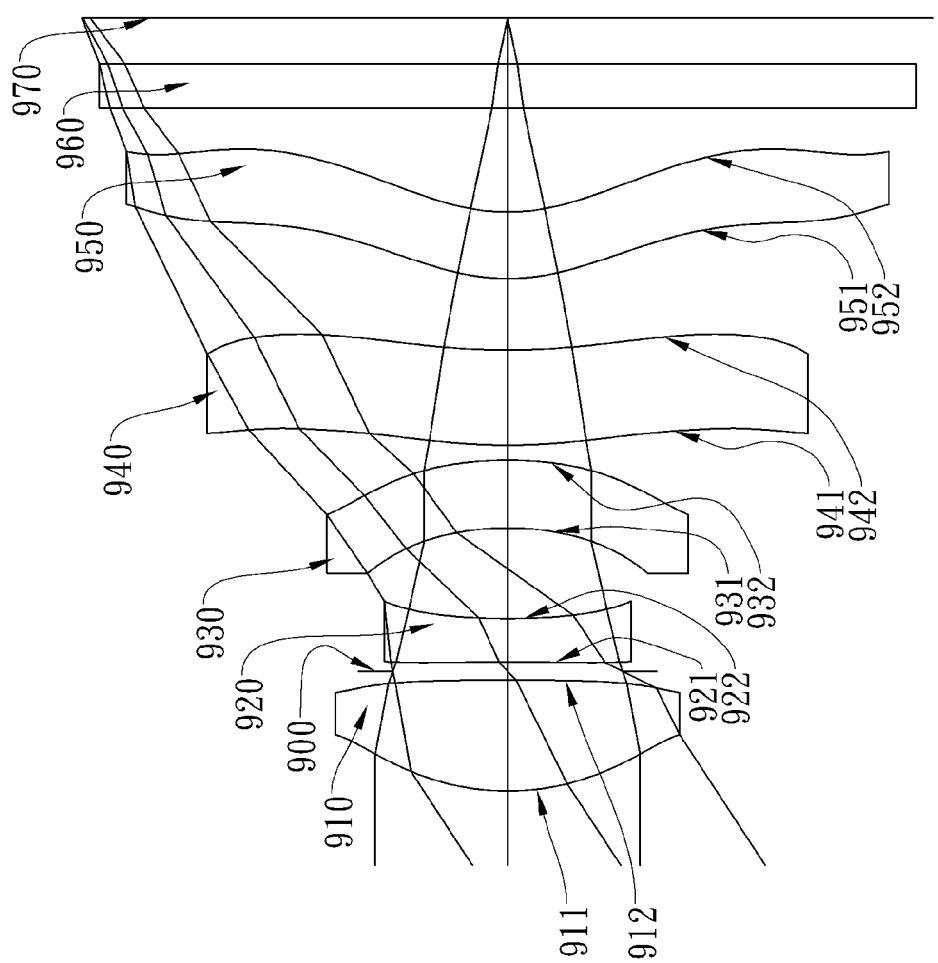
FIG. 9A shows an optical imaging lens assembly in accordance with a ninth embodiment of the present invention.
Figure 9B:
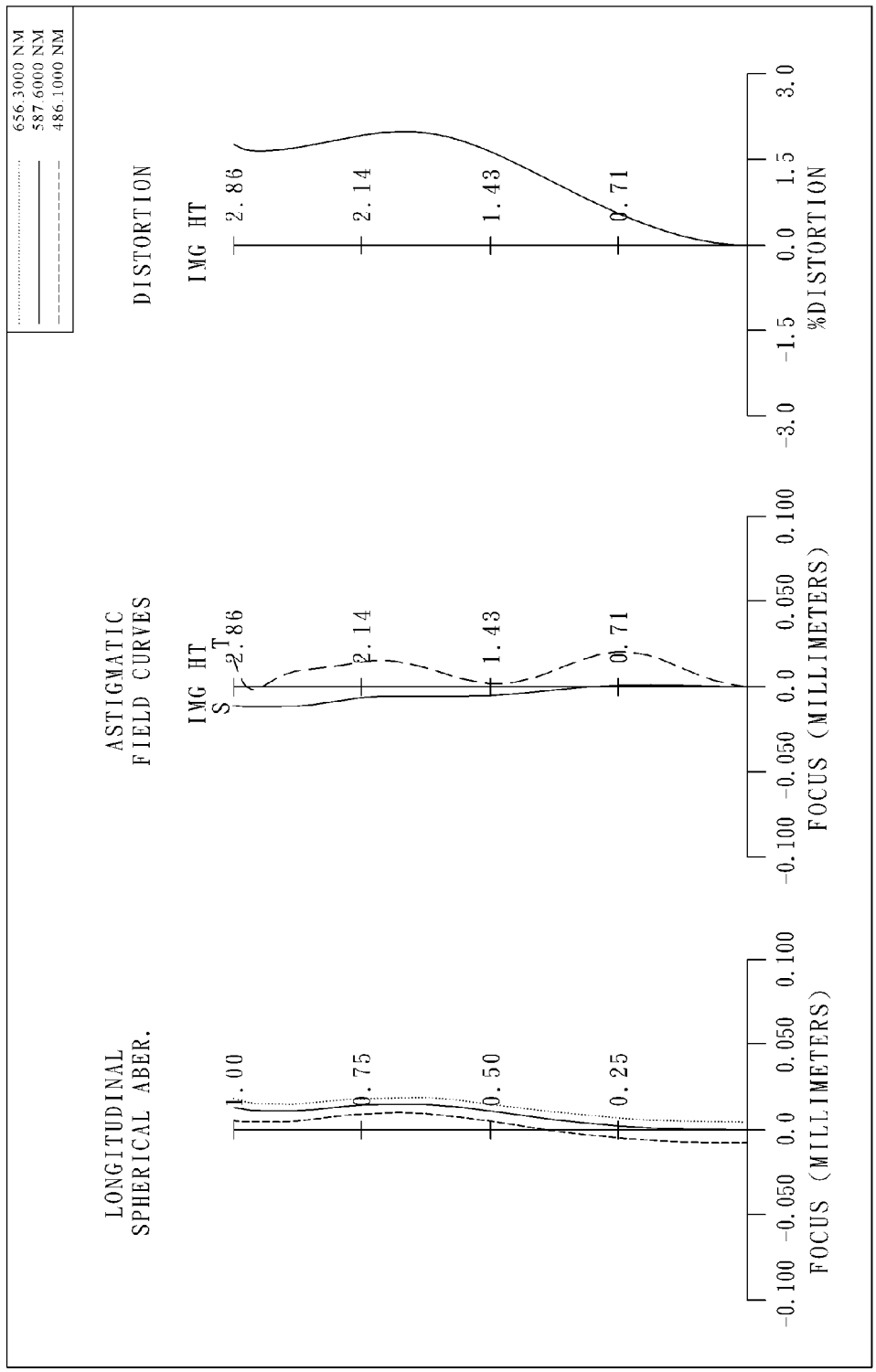
FIG. 9B shows the aberration curves of the ninth embodiment of the present invention.

FIG. 9A shows an optical imaging lens assembly in accordance with the ninth embodiment of the present invention, and FIG. 9B shows the aberration curves of the ninth embodiment of the present invention. The optical imaging lens assembly of the ninth embodiment of the present invention mainly comprises five lens elements, in order from an object side to an image side:

a plastic first lens element 910 with positive refractive power having a convex object-side surface 911 and a convex image-side surface 912, the object-side and image-side surfaces 911 and 912 thereof being aspheric;

a plastic second lens element 920 with negative refractive power having a concave object-side surface 921 and a concave image-side surface 922, the object-side and image-side surfaces 921 and 922 thereof being aspheric;

a plastic third lens element 930 with negative refractive power having a concave object-side surface 931 and a convex image-side surface 932, the object-side and image-side surfaces 931 and 932 thereof being aspheric;

a plastic fourth lens element 940 with positive refractive power having a convex object-side surface 941 and a concave image-side surface 942, the object-side and image-side surfaces 941 and 942 thereof being aspheric, and at least one inflection point is form on both the object-side and image-side surfaces 941 and 942 thereof; and a plastic fifth lens element 950 with positive refractive power having a convex object-side surface 951 and a concave image-side surface 952, the object-side and image-side surfaces 951 and 952 thereof being aspheric, and at least one inflection point is form on both the object-side and image-side surfaces 951 and 952 thereof;

wherein an aperture stop 900 is disposed between the first lens element 910 and the second lens element 920;

the optical imaging lens assembly further comprises an IR filter 960 disposed between the image-side surface 952 of the fifth lens element 950 and an image plane 970, and the IR filter 960 is made of glass and has no influence on the focal length of the optical imaging lens assembly; the optical imaging lens assembly further comprises an electronic sensor provided on the image plane 970.

The equation of the aspheric surface profiles of the ninth embodiment has the same form as that of the first embodiment.

In the ninth embodiment of the present optical imaging lens assembly, the focal length of the optical imaging lens assembly is f, and it satisfies the relation: f=4.31 (mm).

In the ninth embodiment of the present optical imaging lens assembly, the f-number of the optical imaging lens assembly is Fno, and it satisfies the relation: Fno=2.40.

In the ninth embodiment of the present optical imaging lens assembly, half of the maximal field of view of the optical imaging lens assembly is HFOV, and it satisfies the relation: HFOV=33.2 deg.

In the ninth embodiment of the present optical imaging lens assembly, the Abbe number of the first lens element 910 is V1, the Abbe number of the second lens element 920 is V2, and they satisfy the relation: V1−V2=32.5.

In the ninth embodiment of the present optical imaging lens assembly, the Abbe number of the first lens element 910 is V1, the Abbe number of the second lens element 920 is V2, the Abbe number of the third lens element 930 is V3, and they satisfy the relation: V1−V2−V3=9.1.

In the ninth embodiment of the present optical imaging lens assembly, the radius of curvature of the object-side surface 911 of the first lens element 910 is R1, the radius of curvature of the image-side surface 912 of the first lens element 910 is R2, and they satisfy the relation: |R1/R2|=0.03.

In the ninth embodiment of the present optical imaging lens assembly, the radius of curvature of the object-side surface 931 of the third lens element 930 is R5, the radius of curvature of the image-side surface 932 of the third lens element 930 is R6, and they satisfy the relation: R5/R6=0.76.

In the ninth embodiment of the present optical imaging lens assembly, the radius of curvature of the object-side surface 941 of the fourth lens element 940 is R7, the radius of curvature of the image-side surface 942 of the fourth lens element 940 is R8, and they satisfy the relation: R7/R8=0.85.

In the ninth embodiment of the present optical imaging lens assembly, the radius of curvature of the object-side surface 951 of the fifth lens element 950 is R9, the radius of curvature of the image-side surface 952 of the fifth lens element 950 is R10, and they satisfy the relation: R9/R10=1.05.

In the ninth embodiment of the present optical imaging lens assembly, the thickness of the second lens element 920 on the optical axis is CT2, a focal length of the optical imaging lens assembly is f, and they satisfy the relation: (CT2/f)*100=6.80.

In the ninth embodiment of the present optical imaging lens assembly, the on-axis spacing between the second lens element 920 and the third lens element 930 is T23, a focal length of the optical imaging lens assembly is f, and they satisfy the relation: (T23/f)*10=1.42.

In the ninth embodiment of the present optical imaging lens assembly, the focal length of the second lens element 920 is f2, the focal length of the third lens element 930 is f3, and they satisfy the relation: f2/f3=0.32.

In the ninth embodiment of the present optical imaging lens assembly, the focal length of the third lens element 930 is f3, the focal length of the fourth lens element 940 is f4, and they satisfy the relation: |f3/f4|=0.58.

In the ninth embodiment of the present optical imaging lens assembly, a focal length of the optical imaging lens assembly is f, a focal length of the third lens element 930 is f3, a focal length of the fourth lens element 940 is f4, a focal length of the fifth lens element 950 is f5, and they satisfy the relation: |f/f3|+|f/f4|+|f/f5|=0.49.

In the ninth embodiment of the present optical imaging lens assembly, the distance on the optical axis between the aperture stop 900 and the electronic sensor is SL, the distance on the optical axis between the object-side surface 911 of the first lens element 900 and the electronic sensor is TTL, and they satisfy the relation: SL/TTL=0.84.

In the ninth embodiment of the present optical imaging lens assembly, the distance on the optical axis between the object-side surface 911 of the first lens element 910 and the electronic sensor is TTL, half of the diagonal length of the effective pixel area of the electronic sensor is ImgH, and they preferably satisfy the relation: TTL/ImgH=1.79.

The detailed optical data of the ninth embodiment is shown in FIG. 27 (TABLE 17), and the aspheric surface data is shown in FIG. 28 (TABLE 18), wherein the units of the radius of curvature, the thickness and the focal length are expressed in mm, and HFOV is half of the maximal field of view.

Embodiment 10

Figure 10A:
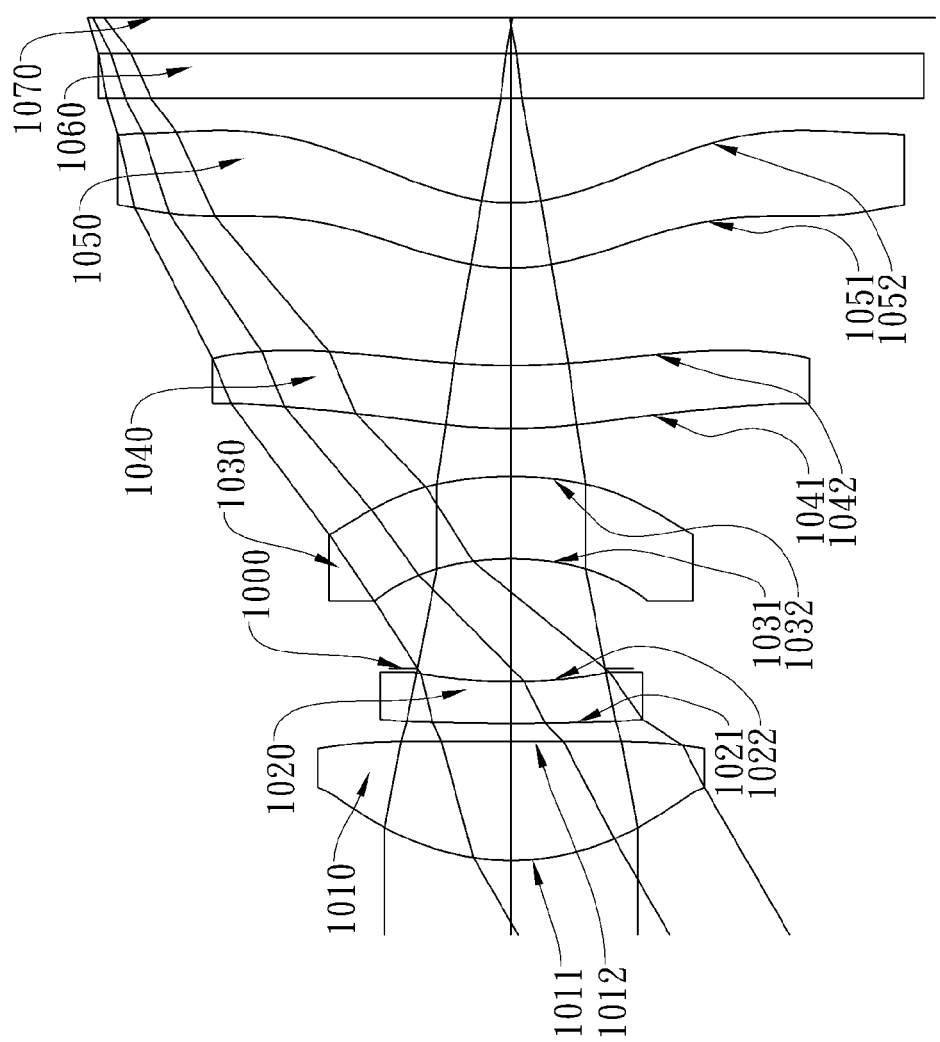
FIG. 10A shows an optical imaging lens assembly in accordance with a tenth embodiment of the present invention.
Figure 10B:
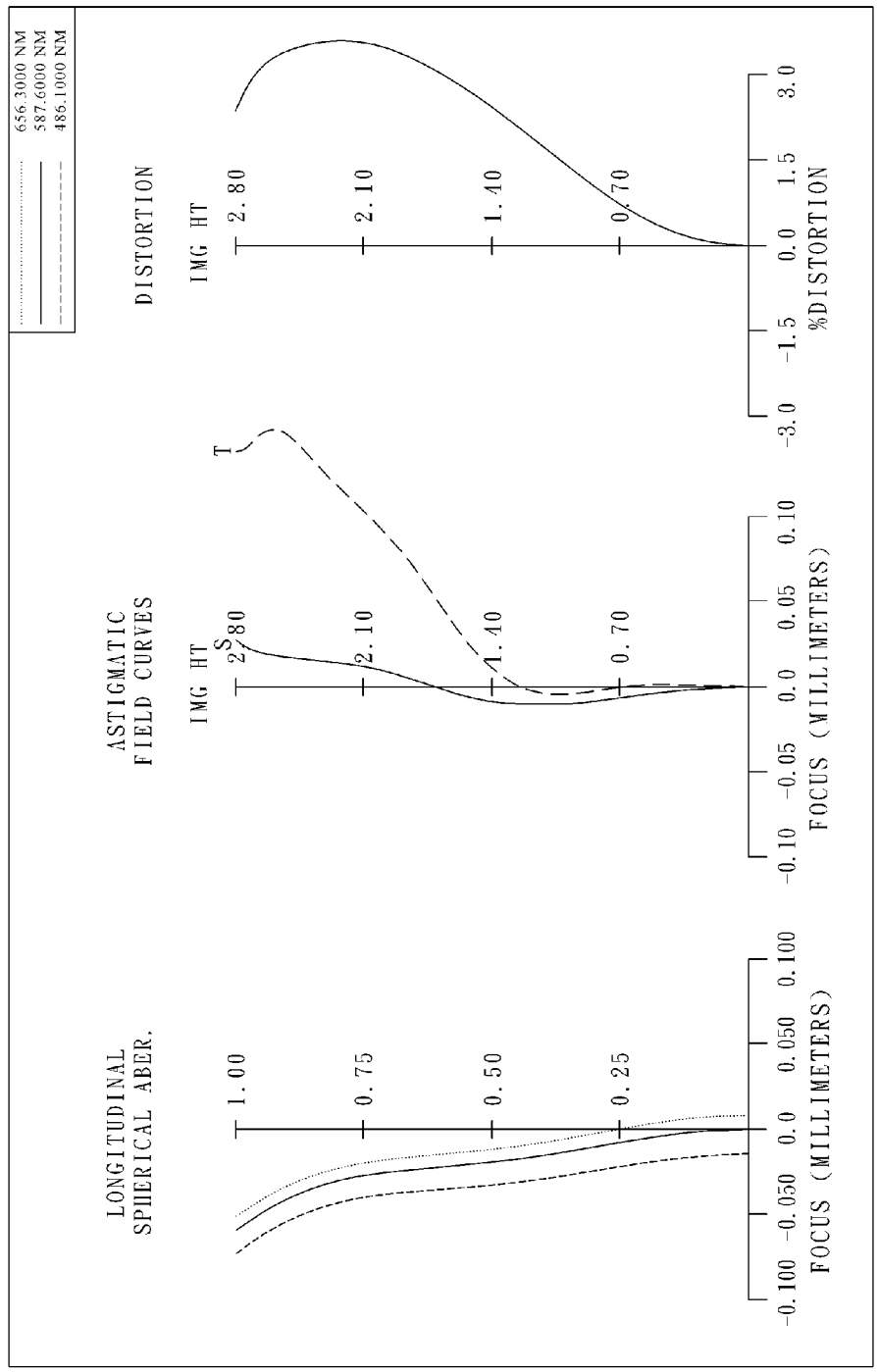
FIG. 10B shows the aberration curves of the tenth embodiment of the present invention.

FIG. 10A shows an optical imaging lens assembly in accordance with the tenth embodiment of the present invention, and FIG. 10B shows the aberration curves of the tenth embodiment of the present invention. The optical imaging lens assembly of the tenth embodiment of the present invention mainly comprises five lens elements, in order from an object side to an image side:

a plastic first lens element 1010 with positive refractive power having a convex object-side surface 1011 and a concave image-side surface 1012, the object-side and image-side surfaces 1011 and 1012 thereof being aspheric;

a plastic second lens element 1020 with negative refractive power having a convex object-side surface 1021 and a concave image-side surface 1022, the object-side and image-side surfaces 1021 and 1022 thereof being aspheric;

a plastic third lens element 1030 with negative refractive power having a concave object-side surface 1031 and a convex image-side surface 1032, the object-side and image-side surfaces 1031 and 1032 thereof being aspheric;

a plastic fourth lens element 1040 with positive refractive power having a convex object-side surface 1041 and a concave image-side surface 1042, the object-side and image-side surfaces 1041 and 1042 thereof being aspheric, and at least one inflection point is form on both the object-side and image-side surfaces 1041 and 1042 thereof; and a plastic fifth lens element 1050 with negative refractive power having a convex object-side surface 1051 and a concave image-side surface 1052, the object-side and image-side surfaces 1051 and 1052 thereof being aspheric, and at least one inflection point is form on both the object-side and image-side surfaces 1051 and 1052 thereof;

wherein an aperture stop 1000 is disposed between the second lens element 1020 and the third lens element 1030;

the optical imaging lens assembly further comprises an IR filter 1060 disposed between the image-side surface 1052 of the fifth lens element 1050 and an image plane 1070, and the IR filter 1060 is made of glass and has no influence on the focal length of the optical imaging lens assembly; the optical imaging lens assembly further comprises an electronic sensor provided on the image plane 1070.

The equation of the aspheric surface profiles of the tenth embodiment has the same form as that of the first embodiment.

In the tenth embodiment of the present optical imaging lens assembly, the focal length of the optical imaging lens assembly is f, and it satisfies the relation: f=4.74 (mm).

In the tenth embodiment of the present optical imaging lens assembly, the f-number of the optical imaging lens assembly is Fno, and it satisfies the relation: Fno=2.80.

In the tenth embodiment of the present optical imaging lens assembly, half of the maximal field of view of the optical imaging lens assembly is HFOV, and it satisfies the relation: HFOV=30.1 deg.

In the tenth embodiment of the present optical imaging lens assembly, the Abbe number of the first lens element 1010 is V1, the Abbe number of the second lens element 1020 is V2, and they satisfy the relation: V1−V2=32.1.

In the tenth embodiment of the present optical imaging lens assembly, the Abbe number of the first lens element 1010 is V1, the Abbe number of the second lens element 1020 is V2, the Abbe number of the third lens element 1030 is V3, and they satisfy the relation: V1−V2−V3=8.7.

In the tenth embodiment of the present optical imaging lens assembly, the radius of curvature of the object-side surface 1011 of the first lens element 1010 is R1, the radius of curvature of the image-side surface 1012 of the first lens element 1010 is R2, and they satisfy the relation: |R1/R2|=0.06.

In the tenth embodiment of the present optical imaging lens assembly, the radius of curvature of the object-side surface 1031 of the third lens element 1030 is R5, the radius of curvature of the image-side surface 1032 of the third lens element 1030 is R6, and they satisfy the relation: R5/R6=0.77.

In the tenth embodiment of the present optical imaging lens assembly, the radius of curvature of the object-side surface 1041 of the fourth lens element 1040 is R7, the radius of curvature of the image-side surface 1042 of the fourth lens element 1040 is R8, and they satisfy the relation: R7/R8=0.70.

In the tenth embodiment of the present optical imaging lens assembly, the radius of curvature of the object-side surface 1051 of the fifth lens element 1050 is R9, the radius of curvature of the image-side surface 1052 of the fifth lens element 1050 is R10, and they satisfy the relation: R9/R10=1.14.

In the tenth embodiment of the present optical imaging lens assembly, the thickness of the second lens element 1020 on the optical axis is CT2, a focal length of the optical imaging lens assembly is f, and they satisfy the relation: (CT2/f)*100=5.91.

In the tenth embodiment of the present optical imaging lens assembly, the on-axis spacing between the second lens element 1020 and the third lens element 1030 is T23, a focal length of the optical imaging lens assembly is f, and they satisfy the relation: (T23/f)*10=1.73.

In the tenth embodiment of the present optical imaging lens assembly, the focal length of the second lens element 1020 is f2, the focal length of the third lens element 1030 is f3, and they satisfy the relation: f2/f3=0.35.

In the tenth embodiment of the present optical imaging lens assembly, the focal length of the third lens element 1030 is f3, the focal length of the fourth lens element 1040 is f4, and they satisfy the relation: |f3/f4|=1.14.

In the tenth embodiment of the present optical imaging lens assembly, a focal length of the optical imaging lens assembly is f, a focal length of the third lens element 1030 is f3, a focal length of the fourth lens element 1040 is f4, a focal length of the fifth lens element 1050 is f5, and they satisfy the relation: |f/f3|+|f/f4|+|f/f5|=0.50.

In the tenth embodiment of the present optical imaging lens assembly, the distance on the optical axis between the aperture stop 1000 and the electronic sensor is SL, the distance on the optical axis between the object-side surface 1011 of the first lens element 1000 and the electronic sensor is TTL, and they satisfy the relation: SL/TTL=0.77.

In the tenth embodiment of the present optical imaging lens assembly, the distance on the optical axis between the object-side surface 1011 of the first lens element 1010 and the electronic sensor is TTL, half of the diagonal length of the effective pixel area of the electronic sensor is ImgH, and they preferably satisfy the relation: TTL/ImgH=1.98.

The detailed optical data of the tenth embodiment is shown in FIG. 29 (TABLE 19), and the aspheric surface data is shown in FIG. 30 (TABLE 20), wherein the units of the radius of curvature, the thickness and the focal length are expressed in mm, and HFOV is half of the maximal field of view.

It is to be noted that TABLES 1-20 (illustrated in FIGS. 11-30 respectively) show different data of the different embodiments, however, the data of the different embodiments are obtained from experiments. Therefore, any optical imaging lens assembly of the same structure is considered to be within the scope of the present invention even if it uses different data. The embodiments depicted above and the appended drawings are exemplary and are not intended to limit the scope of the present invention. TABLE 21 (illustrated in FIG. 31) shows the data of the respective embodiments resulting from the equations.

What is claimed is:

1. An optical imaging lens assembly comprising five lens elements with refractive power, in order from an object side to an image side:

a first lens element with positive refractive power having a convex object-side surface;

a second lens element with negative refractive power having a concave image-side surface;

a third lens element with negative refractive power;

a fourth lens element having a convex object-side surface and a concave image-side surface, and at least one of the object-side and image-side surfaces thereof being aspheric; and a fifth lens element having a concave image-side surface, at least one of the object-side and image-side surfaces thereof being aspheric, and at least one inflection point is formed on at least one of the object-side and image-side surfaces thereof;

wherein a focal length of the second lens element is f2, a focal length of the third lens element is f3, the optical imaging lens assembly further comprises an aperture stop, a distance on an optical axis between the aperture stop and an image plane is SL, a distance on the optical axis between the object-side surface of the first lens element and the image plane is TTL, and they satisfy the relation:

$0 < f2/f3 < 1.7$; and $0.65 < SL/TTL < 0.92$.

2. The optical imaging lens assembly according to claim 1, wherein the fourth lens element is made of plastic, and the fifth lens element is made of plastic.

3. The optical imaging lens assembly according to claim 2, wherein the third lens element has a concave object-side surface and a convex image-side surface.

4. The optical imaging lens assembly according to claim 3, wherein a focal length of the optical imaging lens assembly is f, a focal length of the third lens element is f3, a focal length of the fourth lens element is f4, a focal length of the fifth lens element is f5, and they satisfy the relation:

$0 < |f/f3| + |f/f4| + |f/f5| < 0.8$.

5. The optical imaging lens assembly according to claim 3, wherein a focal length of the third lens element is f3, a focal length of the fourth lens element is f4, and they satisfy the relation:

$|f3/f4| < 0.90$.

6. The optical imaging lens assembly according to claim 3, wherein an Abbe number of the first lens element is V1, an Abbe number of the second lens element is V2, and they satisfy the relation:

$30 < V1 - V2 < 42$.

7. The optical imaging lens assembly according to claim 3, wherein an on-axis spacing between the second lens element and the third lens element is T23, a focal length of the optical imaging lens assembly is f, and they satisfy the relation:

$0.40 < (T23/f)*10 < 1.75$.

8. The optical imaging lens assembly according to claim 3, wherein a focal length of the second lens element is f2, a focal length of the third lens element is f3, and they satisfy the relation:

$0 < f2/f3 < 0.7$.

9. The optical imaging lens assembly according to claim 2, wherein a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, a radius of curvature of the object-side surface of the fifth lens element is R9, a radius of curvature of the image-side surface of the fifth lens element is R10, and they satisfy the relation:

$0.5 < R5/R6 < 1.8$;

$0.5 < R7/R8 < 1.8$; and $0.5 < R9/R10 < 1.8$.

10. The optical imaging lens assembly according to claim 2, wherein an Abbe number of the first lens element is V1, an Abbe number of the second lens element is V2, an Abbe number of the third lens element is V3, and they satisfy the relation:

$-10 < V1 - V2 - V3 < 20$.

11. The optical imaging lens assembly according to claim 2, wherein the optical imaging lens assembly further comprises an electronic sensor positioned on an image plane; a distance on an optical axis between the object-side surface of the first lens element and an image plane is TTL, half of a diagonal length of an effective pixel area of the electronic sensor is ImgH, and they satisfy the relation:

$TTL/ImgH < 2.0$.

* * * * *